US007368503B2

(12) United States Patent
Hale

(10) Patent No.: US 7,368,503 B2
(45) Date of Patent: May 6, 2008

(54) COMPATIBILIZED BLENDS OF BIODEGRADABLE POLYMERS WITH IMPROVED RHEOLOGY

(75) Inventor: Wesley Raymond Hale, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/999,475

(22) Filed: Nov. 30, 2004

(65) Prior Publication Data
US 2005/0154114 A1 Jul. 14, 2005

Related U.S. Application Data

(60) Provisional application No. 60/531,739, filed on Dec. 22, 2003.

(51) Int. Cl.
C08L 33/00 (2006.01)
C08L 67/00 (2006.01)
C08L 69/00 (2006.01)
C08L 77/00 (2006.01)

(52) U.S. Cl. .............. 525/64; 525/54.24; 525/66; 525/67; 525/92 B; 525/92 E; 525/92 F; 525/165; 525/166; 525/173; 525/176; 525/178; 525/186

(58) Field of Classification Search .......... 525/54.24, 525/92 B, 92 F, 66, 64, 67, 92 E, 92 L, 186, 525/165, 166, 178, 173, 176, 179, 182, 183
See application file for complete search history.

(56) References Cited

U.S. PATENT DOCUMENTS

| 2,012,267 | A | | 8/1935 | Carothers |
| 5,053,482 | A | | 10/1991 | Tietz |
| 5,097,004 | A | | 3/1992 | Gallagher et al. |
| 5,097,005 | A | | 3/1992 | Tietz |
| 5,171,308 | A | | 12/1992 | Gallagher et al. |
| 5,219,646 | A | | 6/1993 | Gallagher et al. |
| 5,252,642 | A | | 10/1993 | Sinclair et al. |
| 5,290,631 | A | | 3/1994 | Fleury et al. |
| 5,295,985 | A | | 3/1994 | Romesser et al. |
| 5,446,079 | A | | 8/1995 | Buchanan et al. |
| 5,580,911 | A | | 12/1996 | Buchanan et al. |
| 5,599,858 | A | | 2/1997 | Buchanan et al. |
| 5,661,193 | A | | 8/1997 | Khemani |
| 5,756,651 | A | | 5/1998 | Chen et al. |
| 5,817,721 | A | | 10/1998 | Warzelhan et al. |
| 5,883,199 | A | * | 3/1999 | McCarthy et al. ......... 525/437 |
| 5,939,467 | A | | 8/1999 | Wnuk et al. |
| 6,096,809 | A | | 8/2000 | Lorcks et al. |
| 6,303,677 | B1 | | 10/2001 | Warzelhan et al. |
| 6,573,340 | B1 | | 6/2003 | Khemani et al. |
| 6,787,613 | B2 | | 9/2004 | Bastioli et al. |
| 6,844,380 | B2 | * | 1/2005 | Favis et al. ............... 524/52 |
| 6,869,985 | B2 | * | 3/2005 | Mohanty et al. ........... 523/124 |
| 7,160,977 | B2 | | 1/2007 | Hale et al. |

| 2003/0187149 | A1 | 10/2003 | Schmidt et al. |
| 2004/0248486 | A1 | 12/2004 | Hodson |

FOREIGN PATENT DOCUMENTS

| CA | 2 258 843 | 4/2005 |
| JP | 2002127343 | 5/2002 |
| JP | 2002309074 | 10/2002 |
| JP | 2002327107 | 11/2002 |
| JP | 2003064245 | 3/2003 |
| JP | 2003119302 | 4/2003 |
| JP | 2003119367 | 4/2003 |
| JP | 2003160675 | 6/2003 |
| JP | 2003181919 | 7/2003 |
| JP | 2003268088 | 9/2003 |
| JP | 2003301096 | 10/2003 |
| JP | 2003335933 | 11/2003 |
| WO | WO 99/23161 | 5/1999 |
| WO | WO 99/23163 | 5/1999 |
| WO | WO 02/016468 | 8/2000 |
| WO | WO 02/078944 | 10/2002 |

OTHER PUBLICATIONS

Bastioli, C., Degradable Polymers, 1995, pp. 112-137, Chapman & Hall: London.

Mixing and Compounding of Polymers, 1994, Chapters 1-5 and 18-23, I. Manas-Zloczower & Z. Tadmor editors, Carl Hanser Verlag Publisher, New York, NY.

Coleman, Michael M., Graf, John E., Painter, Paul C., Specific Interactions and the Miscibility of Polymer Blends, 1991, Chapters 1, 2 and 6, Technomic Publishing, Lancaster.

(Continued)

Primary Examiner—Ana Woodward
(74) Attorney, Agent, or Firm—Betty J. Boshears; Louis N. Moreno; Bernard J. Graves, Jr.

(57) ABSTRACT

This invention relates to a blend of biodegradable polymers comprising:
(A) about 5% to about 95% by weight of at least one flexible biodegradable polymer (A) having a glass transition less than about 0° C.,
(B) about 5% to about 95% by weight of at least one rigid biodegradable polymer (B) having a glass transition greater than about 10° C., and
(C) about 0.25 to about 10 weight % of at least one compatibilizer (C), said percentages being based on the total weight of the polymer blend;
where the polymer blend has a higher zero shear melt viscosity than polymers (A) and (B) separately.

78 Claims, No Drawings

OTHER PUBLICATIONS

Sears, J. Kern and Darby, Joseph R., The Technology of Plasticizers, 1982, pp. 136-137, Society of Plastic Engineers/Wiley and Sons, New York.

Coleman et al., Polymer 31, 1187 (1990).

Lourdin, D. Et al., "Influence of Equilibrium Relative Humidity and Plasticizer Concentration on the water content and glass transition of starch materials," revised Jan. 9, 1997.

\* cited by examiner

COMPATIBILIZED BLENDS OF BIODEGRADABLE POLYMERS WITH IMPROVED RHEOLOGY

RELATED APPLICATIONS

This application claims the benefit of the following provisional application under 35 USC 119: Ser. No. 60/531,739, filed Dec. 22, 2003, incorporated herein by reference.

FIELD OF THE INVENTION

The present invention relates generally to biodegradable polymer blends. Preferably, the present invention relates to blends of two biopolymers, such as biodegradable polyesters and polyester amides, in order to yield blends with improved processability when processed with a compatibilizer. The biodegradable polymer blends may be suitable for a number of applications.

BACKGROUND OF THE INVENTION

Biodegradable materials are comprised of components which, by microbial catalyzed degradation, are reduced in strength by reduction in polymer size to monomers or short chains which are then assimilated by the microbes. In an aerobic environment, these monomers or short chains are ultimately oxidized to $CO_2$, $H_2O$, and new cell biomass. In an anaerobic environment the monomers or short chains are ultimately oxidized to $CO_2$, $H_2O$, acetate, methane, and cell biomass. Successful biodegradation requires that direct physical contact must be established between the biodegradable material and the active microbial population or the enzymes produced by the active microbial population. An active microbial population useful for degrading the films and blends of the invention can generally be obtained from any municipal or industrial wastewater treatment facility in which the influents (waste stream) are high in cellulose materials. Moreover, successful biodegradation requires that certain minimal physical and chemical requirements be met such as suitable pH, temperature, oxygen concentration, proper nutrients, and moisture level.

In response to the demand for biopolymers, a number of new biopolymers have been developed which have been shown to biodegrade when discarded into the environment.

Currently known biopolymers have unique properties, benefits and weaknesses. For example, some of the biopolymers tend to be strong but also quite rigid and brittle. This makes them poor candidates when flexible sheets or films are desired, such as for use in making wraps, bags and other packaging materials requiring good bend and folding capability. For other bipolymers, it is not believed that films can be blown from them.

On the other hand, biopolymers such as PCL, and certain aliphatic aromatic polyesters currently available in the market are many times more flexible compared to the more rigid biopolymers discussed immediately above. However, they have relatively low melting points such that they tend to be self adhering when newly processed and/or exposed to heat. While easily blown into films, such films are difficult to process on a mass scale since they will tend to self adhere when rolled onto spools, which is typically required for sale and transport to other locations and companies. To prevent self-adhesion (or "blocking") of such films, it is typically necessary to incorporate silica or other fillers. As the aforementioned example for blowing films suggests, the molding, extruding, and forming of thicker parts is also extremely difficult.

Another important criterion for molded, extruded, or formed parts is temperature stability. "Temperature stability" is the ability to maintain desired properties even when exposed to elevated or depressed temperatures, or a large range of temperatures, which may be encountered during shipping or storage. For example, many of the more flexible biopolymers tend to become soft and sticky if heated significantly above room temperature, thus compromising their ability to maintain their desired packaging properties. Other polymers can become rigid and brittle upon being cooled significantly below freezing (i.e., 0° C.). Thus, a single homopolymer or copolymer may not by itself have sufficient stability within large temperature ranges.

In view of the foregoing, it would be an advancement in the art to provide biodegradable polymer blends with improved processability which could be readily formed into molded, extruded, or formed parts that have both good strength and impact properties with increased temperature stability over a broad range of temperatures compared to existing biopolymers.

BRIEF SUMMARY OF THE INVENTION

The present invention discloses specific biodegradable polymer blend composition ranges having improved processability when in the presence of a compatibilizer. Such polymer blends may be molded, extruded, or formed into films, fibers, and parts for use in a wide variety of applications requiring rigidity, toughness, and biodegradability.

The polymer blend of the invention comprises:
(A) about 5% to about 95% by weight of at least one flexible biodegradable polymer (A) having a glass transition temperature of less than about 0° C.;
(B) about 95% to about 5% by weight of at least one rigid biodegradable polymer (B) having a glass transition temperature greater than about 10° C.; and
(C) about 0.25 to about 10% by weight of at least one compatibilizer (C), said percentages being based on the total weight of the polymer blend; and
wherein the polymer blend has a higher zero shear melt viscosity than polymers (A) and (B) separately.

In another embodiment of the invention, a polymer blend is provided, comprising:
(A) about 5% to about 95% by weight of at least one polymer (A) having a glass transition temperature of less than about 0° C., wherein said polymer (A) comprises:
  (1) diacid residues comprising about 1 to 65 mole percent aromatic dicarboxylic acid residues; and 99 to about 35 mole percent of non-aromatic dicarboxylic acid residues selected from the group consisting of aliphatic dicarboxylic acids residues containing from about 4 to 14 carbon atoms and cycloaliphatic dicarboxylic acids residues containing from about 5 to 15 carbon atoms; wherein the total mole percent of diacid residues is equal to 100 mole percent; and
  (2) diol residues selected from the group consisting of one or more aliphatic diols containing about 2 to 8 carbon atoms, polyalkylene ethers containing about 2 to 8 carbon atoms, and cycloaliphatic diols containing from about 4 to 12 carbon atoms; wherein the total mole percent of diol residues is equal to 100 mole percent;
(B) about 5% to about 95% by weight of at least one polymer (B), wherein said polymer is a biopolymer derived from polylactic acid; and
(C) about 0.25 to about 10 weight % of at least one compatibilizer (C), said percentages being based on from the total weight of the polymer blend; and wherein the polymer blend has a higher zero shear melt viscosity than polymers (A) and (B) separately.

In yet another embodiment of the invention is a polymer blend comprising:
(A) about 5% to about 95% by weight of at least one polymer (A)) having a glass transition temperature of less than about 0° C., wherein said polymer (A) consists essentially of:
  (1) aromatic dicarboxylic acid residues comprising about 35 to 65 mole percent of terephthalic acid residues and 65 to about 35 mole percent of adipic acid residues, glutaric acid residues, or combinations of adipic acid residues and glutaric acid residues; and
  (2) diol residues consisting of 1,4-butanediol;
(B) about 5% to about 95% by weight of at least one polymer (B), wherein said polymer is a biopolymer derived from polylactic acid; and
(C) about 0.25 to about 10 weight % of at least one compatibilizer (C) consisting essentially of polyacrylate, said percentages being based on the total weight of the polymer blend; and wherein the polymer blend has a higher zero shear melt viscosity than polymers (A) and (B) separately.

In any of these embodiments, the weight percentages of polymer (A) may be present at from about 15 to about 85 weight % and polymer (B) may be present at from about about 15 to about 85 weight %. Preferably, the weight percent percentages of polymer(A) may be present at from about 50 to about 85 weight % and polymer (B) may be present at from about about 15 to about 50 weight %. More preferably, the weight percent percentages of polymer (A) may be present at from about 20 to about 40 weight % and polymer (B) may be present at from about about 60 to about 80 weight %. Even more preferably, the weight percent percentages of polymer (A) may be present at from about 20 to about 31 weight % and polymer (B) may be present at from about about 80 to about 69 weight %. All of the described weight percentages are based on the total weight percentages of the polymer blend equaling 100 weight %.

These biodegradable polymer blends provide improved processability which can be readily formed into molded, extruded, or formed parts that have both good strength and impact properties with increased temperature stability over a broad range of temperatures compared to existing biopolymer blends.

DETAILED DESCRIPTION

The invention achieves the foregoing improvements by blending at least one biopolymer having relatively high stiffness (rigid), hereinafter also referred to as "biopolymer(s) (B)", with at least one biopolymer (A) having relatively high flexibility, hereinafter also referred to as "biopolymer(s) (A)". The novel blends have improved processability as characterized by zero shear melt viscosity when compared to the individual polymer components. Moreover, such blends are superior to conventional plastics, which suffer from their inability to degrade when discarded in the environment.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "C1 to C5 hydrocarbons", is intended to specifically include and disclose C1 and C5 hydrocarbons as well as C2, C3, and C4 hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Any of the weight percentages described herein for one embodiment may be used in combination with other embodiments.

In response to the demand for biopolymers, a number of new biopolymers have been developed which have been shown to biodegrade when discarded into the environment. Some of these are aliphatic-aromatic copolyesters, polyesteramides, a modified polyethylene terephthalate, polymers based on polylactic acid, polymers known as polyhydroxyalkanoates (PHA), which include polyhydroxybutyrates (PHB), polyhydroxyvalerates (PHV), and polyhydroxybutyrate-hydroxyvalerate copolymers (PHBV), and polycaprolactone (PCL).

The polymer blends according to the invention include at least one biopolymer having relatively high stiffness and at least one biopolymer having relatively high flexibility. When blended together in the correct proportions, it is possible to derive the beneficial properties from each polymer while offsetting or eliminating the negative properties of each polymer if used separately to molded, extruded, or formed parts for a broad variety of applications. By blending a relatively rigid polymer with a relatively flexible polymer, the inventors have discovered that, when compatibilized, the melt viscosity properties of the blend actually exceed the desirable properties of each polymer when used individually. Thus, there is an unexpected synergistic effect.

Biopolymers (A) that may be characterized as being generally "flexible" include those polymers having a glass transition temperature of less than about 0° C. In one embodiments, the flexible biopolymers (A) will have a glass transition temperature of less than about −10° C. In other embodiments of the invention, the flexible biopolymers will have a glass transition temperature of less than about −20° C., and even more preferably, less than about −30° C.

The "flexible" (A) polymers, characterized as those polymers generally having a glass transition less than about 0° C., will preferably have a concentration in a range from about 15% to about 50% by weight, more preferably in a range from about 20% to about 40% by weight, and even more preferably in a range from about 21% to about 30% by weight, based on the total weight of the polymer blend.

Examples of soft or flexible biopolymers (A) include but are not limited to the following: aliphatic-aromatic copolyesters (such as those manufactured by BASF and previously manufactured by Eastman Chemical Company), aliphatic polyesters which comprise repeating units having at least 5 carbon atoms, e.g., polyhydroxyvalerate, polyhydroxybutyrate-hydroxyvalerate copolymer and polycaprolactone (such as those manufactured by Daicel Chemical, Monsanto, Solvay, and Union Carbide), and succinate-based aliphatic polymers, e.g., polybutylene succinate (PBS), polybutylene succinate adipate (PBSA), and polyethylene succinate (PES) (such as those manufactured by Showa High Polymer).

The term "polyester", as used herein, is intended to include "copolyesters" and is understood to mean a synthetic polymer prepared by the polycondensation of one or more difunctional carboxylic acids with one or more difunctional hydroxyl compounds. Typically the difunctional carboxylic acid is a dicarboxylic acid and the difunctional hydroxyl compound is a dihydric alcohol such as, for example, glycols and diols. The term "residue", as used herein, means any organic structure incorporated into a polymer or plasticizer through a polycondensation reaction involving the corresponding monomer. The term "repeating unit", as used herein, means an organic structure having a dicarboxylic acid residue and a diol residue bonded through a carbonyloxy group. Thus, the dicarboxylic acid residues may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

The polyester(s) included in the present invention contain substantially equal molar proportions of acid residues (100 mole %) and diol residues (100 mole %) which react in substantially equal proportions such that the total moles of repeating units is equal to 100 mole %. The mole percentages provided in the present disclosure, therefore, may be based on the total moles of acid residues, the total moles of diol residues, or the total moles of repeating units. For example, a copolyester containing 30 mole % adipic acid, based on the total acid residues, means that the copolyester contains 30 mole % adipic residues out of a total of 100 mole % acid residues. Thus, there are 30 moles of adipic residues among every 100 moles of acid residues. In another example, a copolyester containing 30 mole % 1,6-hexanediol, based on the total diol residues, means that the copolyester contains 30 mole % 1,6-hexanediol residues out of a total of 100 mole % diol residues. Thus, there are 30 moles of 1,6-hexanediol residues among every 100 moles of diol residues.

In one embodiment of this invention, the polymer blends of the invention comprise aliphatic-aromatic copolyesters (referred to as AAPE herein) constituting component (A) of the present invention include those described in U.S. Pat. Nos. 5,661,193, 5,599,858, 5,580,911 and 5,446,079, the disclosures of which are incorporated herein by reference.

In one embodiment, a "flexible" polymer that may be used in the manufacture of the inventive polymer blends includes aliphatic-aromatic copolyesters manufactured by BASF and sold under the trade name ECOFLEX. The aliphatic-aromatic copolyesters manufactured by BASF comprise a statistical copolyester derived from 1,4-butanediol, adipic acid, and dimethylterephthalate (DMT). In some cases, a diisocyanate is used as a chain lengthener.

The copolyester composition of this invention may comprise one or more AAPE's which may be a linear, random copolyester or branched and/or chain extended copolyester comprising diol residues which contain the residues of one or more substituted or unsubstituted, linear or branched, diols selected from aliphatic diols containing 2 to about 8 carbon atoms, polyalkylene ether glycols containing 2 to 8 carbon atoms, and cycloaliphatic diols containing about 4 to about 12 carbon atoms. The substituted diols, typically, will contain 1 to about 4 substituents independently selected from halo, $C^6$-$C^{10}$ aryl, and $C^1$-$C^4$ alkoxy. Examples of diols which may be used include, but are not limited to, ethylene glycol, diethylene glycol, propylene glycol, 1,3-propanediol, 2,2-dimethyl-1,3-propanediol, 1,3-butanediol, 1,4-butanediol, 1,5-pentanediol, 1,6-hexanediol, polyethylene glycol, diethylene glycol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, triethylene glycol, and tetraethylene glycol. Aliphatic diols are preferred in one embodiment. In another embodiment, more preferred diols comprising one or more diols selected from 1,4-butanediol; 1,3-propanediol; ethylene glycol; 1,6-hexanediol; diethylene glycol; and 1,4-cyclohexanedimethanol. In yet another embodiment, 1,4-butanediol, ethylene glycol and 1,4-cyclohexanedimethanol, singly, or in combination, are preferred.

The AAPE also comprises diacid residues which contain about 35 to about 99 mole %, based on the total moles of acid residues, of the residues of one or more substituted or unsubstituted, linear or branched, non-aromatic dicarboxylic acids selected from aliphatic dicarboxylic acids containing 2 to about 12 carbon atoms and cycloaliphatic dicarboxylic acids containing about 5 to about 10 carbon atoms. The substituted non-aromatic dicarboxylic acids will typically contain 1 to about 4 substituents selected from halo, C6-C10 aryl, and C1-C4 alkoxy. Non-limiting examples of aliphatic and cycloaliphatic dicarboxylic acids include malonic, succinic, glutaric, adipic, pimelic, azelaic, sebacic, fumaric, 2,2-dimethyl glutaric, suberic, 1,3-cyclopentanedicarboxylic, 1,4-cyclohexanedicarboxylic, 1,3-cyclohexanedicarboxylic, diglycolic, itaconic, maleic, and 2,5-norbornanedicarboxylic. In addition to the non-aromatic dicarboxylic acids, the AAPE comprises about 1 to about 65 mole %, based on the total moles of acid residues, of the residues of one or more substituted or unsubstituted aromatic dicarboxylic acids containing 6 to about 10 carbon atoms. In the case where substituted aromatic dicarboxylic acids are used, they will typically contain 1 to about 4 substituents selected from halo, C6-C10 aryl, and C1-C4 alkoxy. Non-limiting examples of aromatic dicarboxylic acids which may be used in the AAPE of our invention are terephthalic acid, isophthalic acid, salts of 5-sulfoisophthalic acid, and 2,6-naphthalenedicarboxylic acid. In another embodiment, the AAPE comprises diol residues comprising the residues of one or more of: 1,4-butanediol; 1,3-propanediol; ethylene glycol; 1,6-hexanediol; diethylene glycol; or 1,4-cyclohexanedimethanol; and diacid residues comprising (i) about 35 to about 95 mole %, based on the total moles of acid residues, of the residues of one or more non-aromatic dicarboxylic acids selected from glutaric acid, diglycolic acid, succinic acid, 1,4-cyclohexanedicarboxylic acid, and adipic acid (preferably, glutaric acid and adipic acid, either singly or in combination); (ii) about 5 to about 65 mole %, based on the total moles of acid residues, of the residues of one or more aromatic dicarboxylic acids selected from terephthalic acid and isophthalic acid. More preferably, the non-aromatic dicarboxylic acid may comprise adipic acid and the aromatic dicarboxylic acid may comprise terephthalic acid. In one embodiment, the diol will comprise about 95 to about 100 mole %, preferably 100 mole %, of 1,4-butanediol.

In one embodiment, it is preferred that the AAPE comprise terephthalic acid in the amount of about 25 to about 65 mole %, preferably about 35 to about 65 mole %, and even more preferably, about 40 to about 60 mole %. Also, it is preferred that the AAPE comprise adipic acid in the amount of about 75 to about 35 mole %, preferably about 65 to about 35 mole %, and even more preferably, about 60 to about 40 mole %.

Other preferred compositions for the AAPE's of the present invention are those prepared from the following diols and dicarboxylic acids (or copolyester-forming equivalents thereof such as diesters) in the following mole percent, based on 100 mole percent of a diacid component and 100 mole percent of a diol component:
(1) glutaric acid (about 30 to about 75%); terephthalic acid (about 25 to about 70%); 1,4-butanediol (about 90 to 100%); and modifying diol (0 about 10%);
(2) succinic acid (about 30 to about 95%); terephthalic acid (about 5 to about 70%); 1,4-butanediol (about 90 to 100%); and modifying diol (0 to about 10%); and
(3) adipic acid (about 30 to about 75%); terephthalic acid (about 25 to about 70%); 1,4-butanediol (about 90 to 100%); and modifying diol (0 to about 10%).

In one embodiment, one or more modifying diols are selected from 1,4-cyclohexanedimethanol, triethylene glycol, polyethylene glycol and neopentyl glycol. Some AAPE's may be linear, branched or chain extended copolyesters comprising about 50 to about 60 mole percent adipic acid residues, about 40 to about 50 mole percent terephthalic acid residues, and at least 95 mole percent 1,4-butanediol residues. Even more preferably, the adipic acid residues are from about 55 to about 60 mole percent, the terephthalic acid residues are from about 40 to about 45 mole percent, and the 1,4-butanediol residues are from about 95 to 100 mole percent. Such compositions have been previously commercially available under the trademark Eastar Bio® copolyester from Eastman Chemical Company, Kingsport, Tenn.

Additionally, specific examples of preferred AAPE's include a poly(tetra-methylene glutarate-co-terephthalate) containing (a) 50 mole percent glutaric acid residues, 50 mole percent terephthalic acid residues and 100 mole percent 1,4-butanediol residues, (b) 60 mole percent glutaric acid residues, 40 mole percent terephthalic acid residues and 100 mole percent 1,4-butanediol residues or (c) 40 mole percent glutaric acid residues, 60 mole percent terephthalic acid residues and 100 mole percent 1,4-butanediol residues; a poly(tetramethylene succinate-co-terephthalate) containing (a) 85 mole percent succinic acid residues, 15 mole percent terephthalic acid residues and 100 mole percent 1,4-butanediol residues or (b) 70 mole percent succinic acid residues, 30 mole percent terephthalic acid residues and 100 mole percent 1,4-butanediol residues; a poly(ethylene succinate-co-terephthalate) containing 70 mole percent succinic acid residues, 30 mole percent terephthalic acid residues and 100 mole percent ethylene glycol residues; and a poly(tetramethylene adipate-co-terephthalate) containing (a) 85 mole percent adipic acid residues, 15 mole percent terephthalic acid residues and 100 mole percent 1,4-butanediol residues or (b) 55 mole percent adipic acid residues, 45 mole percent terephthalic acid residues and 100 mole percent 1,4-butanediol residues.

The AAPE preferably comprises from about 10 to about 1,000 repeating units and preferably, from about 15 to about 600 repeating units. The AAPE preferably also has an inherent viscosity of about 0.4 to about 2.0 dL/g, more preferably about 0.7 to about 1.4, as measured at a temperature of 25° C. using a concentration of 0.5 gram copolyester in 100 ml of a 60/40 by weight solution of phenol/tetrachloroethane.

Any of the biopolymers, including but not limited to the AAPE, optionally, may contain the residues of a branching agent. In one embodiment, the weight percentage ranges for the branching agent are from about 0 to about 2 weight (wt % in this disclosure refers to weight %), preferably about 0.1 to about 1 weight %, and most preferably about 0.1 to about 0.5 weight % based on the total weight of the AAPE. The branching agent preferably has a weight average molecular weight of about 50 to about 5000, more preferably about 92 to about 3000, and a functionality of about 3 to about 6. For example, the branching agent may be the esterified residue of a polyol having 3 to 6 hydroxyl groups, a polycarboxylic acid having 3 or 4 carboxyl groups (or ester-forming equivalent groups) or a hydroxy acid having a total of 3 to 6 hydroxyl and carboxyl groups.

Representative low molecular weight polyols that may be employed as branching agents include glycerol, trimethylolpropane, trimethylolethane, polyethertriols, glycerol, 1,2,4-butanetriol, pentaerythritol, 1,2,6-hexanetriol, sorbitol, 1,1,4,4,-tetrakis (hydroxymethyl) cyclohexane, tris(2-hydroxyethyl) isocyanurate, and dipentaerythritol. Particular branching agent examples of higher molecular weight polyols (MW 400-3000) are triols derived by condensing alkylene oxides having 2 to 3 carbons, such as ethylene oxide and porpylene oxide with polyol initiators. Representative polycarboxylic acids that may be used as branching agents include hemimellitic acid, trimellitic (1,2,4-benzenetricarboxylic) acid and anhydride, trimesic (1,3,5-benzenetricarboxylic) acid, pyromellitic acid and anhydride, benzenetetracarboxylic acid, benzophenone tetracarboxylic acid, 1,1,2,2-ethane-tetracarboxylic acid, 1,1,2-ethanetricarboxylic acid, 1,3,5-pentanetricarboxylic acid, and 1,2,3,4-cyclopentanetetracarboxylic acid. Although the acids may be used as such, preferably they are used in the form of their lower alkyl esters or their cyclic anhydrides in those instances where cyclic anhydrides can be formed. Representative hydroxy acids as branching agents include malic acid, citric acid, tartaric acid, 3-hydroxyglutaric acid, mucic acid, trihydroxyglutaric acid, 4-carboxyphthalic anhydride, hydroxyisophthalic acid, and 4-(beta-hydroxyethyl)phthalic acid. Such hydroxy acids contain a combination of 3 or more hydroxyl and carboxyl groups. Especially preferred branching agents include trimellitic acid, trimesic acid, pentaerythritol, trimethylol propane and 1,2,4-butanetriol.

The aliphatic-aromatic polyesters of the invention also may comprise one or more ion-containing monomers to increase their melt viscosity. It is preferred that the ion-containing monomer is selected from salts of sulfoisophthalic acid or a derivative thereof. A typical example of this type of monomer is sodiosulfoisophthalic acid or the dimethyl ester of sodiosulfoisophthalic. The preferred concentration range for ion-containing monomers is about 0.3 to about 5.0 mole %, and, more preferably, about 0.3 to about 2.0 mole %, based on the total moles of acid residues.

One example of a branched AAPE of the present invention is poly-(tetramethylene adipate-co-terephthalate) containing 100 mole percent 1,4-butanediol residues, 43 mole percent terephthalic acid residues and 57 mole percent adipic acid residues and branched with about 0.5 weight percent pentaerythritol. This AAPE may be produced by the transesterification and polycondensation of dimethyl adipate, dimethyl terephthalate, pentaerythritol and 1,4-butanediol. The AAPE may be prepared by any conventional method known in the art such as heating the monomers at 190° C. for 1 hour, 200° C. for 2 hours, 210° C. for 1 hour, then at 250° C. for 1.5 hours under vacuum in the presence of 100 ppm of Ti present initially as titanium tetraisopropoxide.

Another example of a branched AAPE is poly(tetramethylene adipate-co-terephthalate) containing 100 mole percent 1,4-butanediol residues, 43 mole percent terephthalic acid residues and 57 mole percent adipic acid residues and branched with 0.3 weight percent pyromellitic dianhydride. This AAPE is produced via reactive extrusion of linear poly (tetramethylene adipate-co-terephthalate) with pyromellitic dianhydride using an extruder.

The AAPE of the instant invention also may comprise from 0 to about 5 weight %, and in one embodiment, from 0.1 to 5 weight %, based on the total weight of the composition, of one or more chain extenders. Exemplary chain extenders are divinyl ethers such as those disclosed in U.S. Pat. No. 5,817,721 or diisocyanates such as, for example, those disclosed in U.S. Pat. No. 6,303,677. Representative divinyl ethers are 1,4-butanediol divinyl ether, 1,5-hexanediol divinyl ether and 1,4-cyclohexandimethanol divinyl ether.

Representative diisocyanates are toluene 2,4-diisocyanate, toluene 2,6-diisocyanate, 2,4'-diphenylmethane diisocyanate, naphthylene-1,5-diisocyanate, xylylene diisocyanate, hexamethylene diisocyanate, isophorone diisocyanate and methylenebis(2-isocyanatocyclohexane). The preferred diisocyanate is hexamethylene diisocyanate. The weight percent ranges are preferably about 0.3 to about 3.5 wt %, based on the total weight percent of the AAPE, and most preferably about 0.5 to about 2.5 wt %. It is also possible in principle to employ trifunctional isocyanate compounds which may contain isocyanurate and/or biurea groups with a functionality of not less than three, or to replace the diisocyanate compounds partially by tri-or polyisocyanates.

The AAPE's of the instant invention are readily prepared from the appropriate dicarboxylic acids, esters, anhydrides, or salts, the appropriate diol or diol mixtures, and any branching agents using typical polycondensation reaction conditions. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The term "continuous" as used herein means a process wherein reactants are introduced and products withdrawn simultaneously in an uninterrupted manner. By "continuous" it is meant that the process is substantially or completely continuous in operation in contrast to a "batch" process. "Continuous" is not meant in any way to prohibit normal interruptions in the continuity of the process due to, for example, start-up, reactor maintenance, or scheduled shut down periods. The term "batch" process as used herein means a process wherein all the reactants are added to the reactor and then processed according to a predetermined course of reaction during which no material is fed or removed into the reactor. The term "semicontinuous" means a process where some of the reactants are charged at the beginning of the process and the remaining reactants are fed continuously as the reaction progresses. Alternatively, a semicontinuous process may also include a process similar to a batch process in which all the reactants are added at the beginning of the process except that one or more of the products are removed continuously as the reaction progresses. The process is operated advantageously as a continuous process for economic reasons and to produce superior coloration of the polymer as the copolyester may deteriorate in appearance if allowed to reside in a reactor at an elevated temperature for too long a duration.

The AAPE's of the present invention are prepared by procedures known to persons skilled in the art and described, for example, in U.S. Pat. No. 2,012,267. Such reactions are usually carried out at temperatures from 150° C. to 300° C. in the presence of polycondensation catalysts such as, for example, alkoxy titanium compounds, alkali metal hydroxides and alcoholates, salts of organic carboxylic acids, alkyl tin compounds, metal oxides, and the like. The catalysts are typically employed in amounts between 10 to 1000 ppm, based on total weight of the reactants.

The reaction of the diol and dicarboxylic acid may be carried out using conventional copolyester polymerization conditions. For example, when preparing the copolyester by means of an ester interchange reaction, i.e., from the ester form of the dicarboxylic acid components, the reaction process may comprise two steps. In the first step, the diol component and the dicarboxylic acid component, such as, for example, dimethyl terephthalate, are reacted at elevated temperatures, typically, about 150° C. to about 250° C. for about 0.5 to about 8 hours at pressures ranging from about 0.0 kPa gauge to about 414 kPa gauge (60 pounds per square inch, "psig"). Preferably, the temperature for the ester interchange reaction ranges from about 180° C. to about 230° C. for about 1 to about 4 hours while the preferred pressure ranges from about 103 kPa gauge (15 psig) to about 276 kPa gauge (40 psig). Thereafter, the reaction product is heated under higher temperatures and under reduced pressure to form the AAPE with the elimination of diol, which is readily volatilized under these conditions and removed from the system. This second step, or poly-condensation step, is continued under higher vacuum and a temperature which generally ranges from about 230° C. to about 350° C., preferably about 250° C. to about 310° C. and, most preferably, about 260° C. to about 290° C. for about 0.1 to about 6 hours, or preferably, for about 0.2 to about 2 hours, until a polymer having the desired degree of polymerization, as determined by inherent viscosity, is obtained. The polycondensation step may be conducted under reduced pressure which ranges from about 53 kPa (400 torr) to about 0.013 kPa (0.1 torr). Stirring or appropriate conditions are used in both stages to ensure adequate heat transfer and surface renewal of the reaction mixture. The reaction rates of both stages are increased by appropriate catalysts such as, for example, titanium tetrachloride, manganese diacetate, antimony oxide, dibutyl tin diacetate, zinc chloride, or combinations thereof. A three-stage manufacturing procedure, similar to that described in U.S. Pat. No. 5,290,631, may also be used, particularly when a mixed monomer feed of acids and esters is employed. For example, a typical aliphatic-aromatic copolyester, poly(tetramethylene glutarate-co-terephthalate) containing 30 mole percent terephthalic acid residues, may be prepared by heating dimethyl glutarate, dimethyl terephthalate, and 1,4-butanediol first at 200° C. for 1 hour then at 245° C. for 0.9 hour under vacuum in the presence of 100 ppm of Ti present initially as titanium tetraisopropoxide.

To ensure that the reaction of the diol component and dicarboxylic acid component by an ester interchange reaction is driven to completion, it is sometimes desirable to employ about 1.05 to about 2.5 moles of diol component to one mole dicarboxylic acid component. Persons of ordinary skill in the art will understand, however, that the ratio of diol component to dicarboxylic acid component is generally determined by the design of the reactor in which the reaction process occurs.

In the preparation of copolyester by direct esterification, i.e., from the acid form of the dicarboxylic acid component, polyesters are produced by reacting the dicarboxylic acid or a mixture of dicarboxylic acids with the diol component or a mixture of diol components and the branching monomer component. The reaction is conducted at a pressure of from about 7 kPa gauge (1 psig) to about 1379 kPa gauge (200 psig), preferably less than 689 kPa (100 psig) to produce a low molecular weight copolyester product having an average degree of polymerization of from about 1.4 to about 10. The temperatures employed during the direct esterification reaction typically range from about 180° C. to about 280° C., more preferably ranging from about 220° C. to about 270° C. This low molecular weight polymer may then be polymerized by a polycondensation reaction. The polymer presently sold under the name ECOFLEX by BASF has a glass transition temperature of -33° C. and a melting range of 105 to -115° C.

Polycaprolactone (PCL) is also a biodegradable soft aliphatic polyester, polymer (A), useful in the invention which has a relatively low melting point and a very low glass transition temperature. It is so named because it is formed by polymerizing ϵ-caprolactone. The glass transition temperature of PCL is -60° C. and the melting point is only 60° C. Because of this, PCL and other similar aliphatic polyesters with low melting points are difficult to process by conventional techniques such as film blowing and blow molding. Films made from PCL are tacky as extruded and have low melt strength over 130° C. Also, the slow crystallization of this polymer causes the properties to change over time. Blending PCL with other polymers improves the processability of PCL. One common PCL is TONE, manufactured by Union Carbide. Other manufactures of PCL include Daicel Chemical, Ltd. and Solvay.

ϵ-Caprolactone is a seven member ring compound that is characterized by its reactivity. Cleavage usually takes place at the carbonyl group. ϵ-Caprolactone is typically made from cyclohexanone by a peroxidation process. PCL is a polyester made by polymerizing ϵ-caprolactone. Higher molecular weight PCL may be prepared under the influence of a wide variety of catalysts, such as aluminum alkyls, organometallic compositions, such as Group Ia, Ia, IIb, or IIIa metal alkyls, Grignard reagents, Group II metal dialkyls, calcium or other metal amides or alkyl amides, reaction products of alkaline earth hexamoniates, alkaline oxides and acetonitrile, aluminum trialkoxides, alkaline earth aluminum or boron hydrides, alkaline metal or alkaline earth hydrides or alkaline metals alone. PCL is typically prepared by initiation with an aliphatic diol (HO—R—OH), which forms a terminal end group.

Another "flexible" aliphatic polyester, polymer (A), that may be used in manufacturing the inventive polymer blends is polyhydroxybutyrate-hydroxyvalerate copolymer (PHBV), which is manufactured using a microbial-induced fermentation. One such PHBV copolyester is manufactured by Monsanto Company and has a glass transition temperature of about 0° C. and a melting point of about 170° C.

In the fermentation process of manufacturing PHBV, a single bacterium species converts corn and potato feed stocks into a copolymer of polyhydroxybutyrate and hydroxyvalerate constituents. By manipulating the feed stocks, the proportions of the two polymer segments can be varied to make different grades of material. All grades are moisture resistant while still being biodegradable. The world producers of PHBV are Monsanto, with its BIOPOL product, and METABOLIX, with its various grades of polyhydroxy-alkanoates (PHAs).

Another class of "flexible" aliphatic polyesters, polymers (A), are based on repeating succinate units such as polybutylene succinate (PBS), polybutylene succinate adipate (PBSA), and polyethylene succinate (PES). Each of these succinate-based aliphatic polyesters are manufactured by Showa High Polymer, Ltd. and are sold under the trade name BIONELLE. PBS (Bionolle 1001) has a glass transition temperature of -30° C. and a melting point of 114° C. PBSA (Bionolle 3001) has a glass transition temperature of -35° C. and a melting point of 95° C. PES (Bionolle 6000) has a glass transition temperature of -4° C. and a melting point of 102° C.

The target applications for succinate-based aliphatic polyesters include films, sheets, filaments, foam-molded products and foam-expanded products. Succinate-based aliphatic polyesters are biodegradable in compost, in moist soil, in water with activated sludge, and in sea water. PBSA degrades rapidly in a compost environment, so it is similar to cellulose, whereas PBS degrades less rapidly and is similar to newspaper in terms of biodegradation.

Succinic-based aliphatic polyesters are manufactured according to a two-step process of preparing succinate aliphatic polyesters with high molecular weights and useful physical properties. In a first step, a low molecular weight hydroxy-terminated aliphatic polyester prepolymer is made from a glycol and an aliphatic dicarboxylic acid. This polymerization is catalyzed by a titanium catalyst such as tetraisopropyltitanate, tetraisopropoxy titanium, dibutoxydiacetoacetoxy titanium, or tetrabutyltitanate. In the second step, a high molecular weight polyester is made by reacting a diisocyanate, such as hexamethylene diisocyante (HMDI) with a polyester prepolymer. Some manufacturers manufacture PBS by first reacting 1,4-butanediol with succinic acid in a condensation reaction to form a prepolymer and then reacting the prepolymer with HMDI as a chain extender.

PBSA copolymer is manufactured by first condensing 1,4-butanediol, succinic acid and adipic acid to form a prepolymer and then reacting the prepolymer with HMDI as a chain extender.

PES homopolymer is prepared by reacting ethylene glycol and succinic acid and using HMDI or diphenylmethane diisocyanate as a chain extender.

In general, those biopolymers (B) that may be characterized as being generally "rigid" or less flexible include those polymers which have a glass transition temperature greater than about 10° C. The stiff biopolymers (B) will have a glass transition temperature greater than about 20° C. In other embodiments of the invention, the rigid biopolymers (B) will have a glass transition temperature of greater than about 30° C., and most preferably greater than above 40° C.

In addition, "rigid" (B) polymers are generally more crystalline than polymers (A). The rigid polymers (B) will preferably have a concentration in a range from about 50% to about 85% by weight of the biodegradable polymer blend, more preferably in a range from about 60% to about 80% by weight, and most preferably in a range from about 70% to about 79% by weight, based on the total weight of the polymer blend.

Examples of rigid biopolymers (B) include but are not limited to the following: polyesteramides (such as those manufactured by Bayer), a modified polyethylene terephthalate (PET) such as those manufactured by Du Pont, biopolymers based on polylactic acid (PLA) (such as those manufactured by Cargill-Dow Polymers and Dianippon Ink), terpolymers based on polylactic acid, polyglycolic acid, polyalkylene carbonates (such as polyethylene carbonate manufactured by PAC Polymers), polyhydroxyalkanoates (PHA), polyhydroxybutyrates (PHB), polyhydroxyvalerates (PHV), polyhydroxybutyrate-hydroxyvalerate copolymers (PHBV). The biopolymers (B) within the scope of the present invention are preferably synthetic polyesters or polyester amides.

In one embodiment, a rigid polymer that may be used in manufacturing the polymer blends according to the present invention includes polylactic acid (PLA). PLA is a strong thermoplastic material that can be injection molded, extruded, thermoformed, or used as spun or melt-blown fibers to produce nonwoven goods. High polymers of lactic acid (Mn =50,000-110,000) are strong thermoplastics that can be fabricated into useful products that can be broken down by common soil bacteria. Potential applications of PLA include paper coatings for packaging (food and beverage cartons), plastic foam for fast foods, microwavable containers, and other consumer products such as disposable diapers or yard waste bags. PLA can be a homopolymer or it may be copolymerized with glycolides, lactones or other monomers. One particularly attractive feature of PLA-based polymers is that they are derived from renewable agricultural products.

Because lactic acid is difficult to polymerize directly to high polymers in a single step on a commercial scale, most companies employ a two-step process. Lactic acid is first oligomerized to a linear chain with a molecular weight of less than 3000 by removing water. The oligomer is then depolymerized to lactide, which is a cyclic dimer consisting of two condensed lactic acid molecules. This six-member ring is purified and subjected to ring opening polymerization to produce polylactic acid with a molecular weight of 50,000-110,000.

Because lactic acid has an a-symmetric carbon atom, it exists in several isomeric forms. The lactic acid most commonly sold commercially contains equal parts of L-(+)-lactic acid and D-(−)-lactic acid and is therefore optically inactive, with no rotatory power. The racemic mixture is called DL-lactic acid.

Polylactic acid typically has a glass transition temperature of about 59° C. and a melting point of about 178° C. It has low elongation and is quite hard.

Another stiff polymer (B) that may be used within the inventive polymer blends is known as CPLA, which is a derivative of PLA and is sold by Dianippon Ink. Two classes of CPLA are sold and are referred to as "CPLA rigid" and "CPLA flexible", both of which are "rigid" polymers as that term has been defined herein. CPLA hard has a glass transition temperature of 60° C., while CPLA soft has a glass transition temperature of 51° C.

Bayer Corporation manufactures polyesteramides sold under the name BAK. One form of BAK is prepared from adipic acid, 1,4-butanediol, and 6-aminocaproic acid. BAK 1095, a polyesteramide having an Mn of 22,700 and an Mw of 69,700 and which contains aromatic constituents, has a melting point of 125° C. BAK 2195 has a melting point of 175° C. Although the glass transition temperatures of BAK 1095 and BAK 2195 are difficult to measure, because BAK appears to behave like a stiff polymer in the sense that improved properties may be obtained by blending BAK with a soft polymer, the inventors believe that the glass transition temperature of BAK polymers is essentially at least about 10° C.

Another stiff polymer (B) that may be used within the inventive polymer blends includes a range of modified polyethylene terephthalate (PET) polyesters manufactured by DuPont, and sold under the trade name BIOMAX. The modified PET polymers of DuPont are described in greater detail in U.S. Pat. No. 5,053,482 to Tietz, U.S. Pat. No. 5,097,004 to Gallagher et al., U.S. Pat. No. 5,097,005 to Tietz, U.S. Pat. No. 5,171,308 to Gallagher et al., U.S. Pat. No. 5,219,646, to Gallagher et al., and U.S. Pat. No. 5,295,985 to Romesser et al. For purposes of disclosing suitable "rigid" polymers that may be used in the manufacture of polymer blends according to the present invention, the foregoing patents are disclosed herein by specific reference.

In general, the modified PET polymers of DuPont may be characterized as comprising alternating units of terephthalate and an aliphatic constituent, with the aliphatic constituent comprising a statistical distribution of two or more different aliphatic units derived from two or more different diols, such as ethylene glycol, diethylene glycol, triethylene oxide, polyethylene glycol, lower alkane diols, both branched and unbranched, and derivatives of the foregoing. A portion of the aliphatic units may also be derived from an aliphatic diacid, such as adipic acid. In addition, a small percentage of the phenylene groups within the repeating terephthalate units are sulfonated and neutralized with an alkali metal or alkaline earth metal base. Both the aliphatic portion of the modified PET polymer as well as the statistically significant quantity of sulfonated terephthalate units contribute significantly to the biodegradability of the BIOMAX polymer.

Some BIOMAX grades of polymers have a melting point of 200-208° C. and a glass transition temperature of 40-60° C. BIOMAX 6926 is one such grade. It is a relatively strong and stiff polymer and, when blended with a softer polymer, yields excellent sheets and films suitable for wrapping and other packaging materials.

Mitsui Chemicals, Inc. manufactures a terpolymer that includes units derived from polylactide, polyglycolide and polycaprolactone that have been condensed together. Thus, this polymer is an aliphatic polymer and may be characterized as a PLA/PGA/PCL terpolymer. Three grades of this polymer are available, H100J, S100 and T100. The H100J grade PLA/PGA/PCL terpolymer has been analyzed to have a glass transition temperatures of 74° C. and a melting point of 173° C.

PAC Polymers Inc. manufactures polyethylene carbonate (PEC) having a glass transition temperature range of 10 to 28° C. PEC is a stiff polymer for purposes of manufacturing polymer blends according to the present invention.

Both polymers (A) and polymers (B) may have an inherent viscosity of about 0.2 to about 3.0 deciliters/gram as measured at a temperature of 25° C. for a 0.5 g sample in 100 ml of a 60/40 parts by weight solution of phenol/tetrachloroethane.

Component (C) of the invention comprises compatibilizers. Compatibilizers are present in the invention in the amount of 0.25 to about 10 weight %, preferably, about 0.25 to 5 weight %, based on the total weight of the polymer blend. Often times a compatibilizer is a block copolymer of the two components of the immiscible blend (hard polymer and soft polymer of this invention). For example, a block copolymer of A and B is a polymer with one long segment of polymer A joined to another long segment of polymer B. In a blend of soft and hard polymers (Polymer A and Polymer B) with this block copolymer, the A block is going to want to be in the polymer A phase, and the B block is going to want to be in the polymer B phase. The block copolymers tie the two phases together, and allow energy to be transferred from one phase to the other.

Graft copolymers are also used as compatibilizers. Some compatibilizers may contain graft copolymers of polystyrene grafted onto a polybutadiene backbone chain Compatibilization may take into account: (a) the desired level of dispersion, (b) that the created morphology is insensitive to subsequent processing, and (c) that interactions between the phases in the solid state will maximize the products' performance. The compatibilization can be accomplished either by addition of a compatibilizer or by reactive processing.

Considering the simplest case of a binary A/B polymer blend with A-B type block copolymer, it has been concluded that: (i) the interfacial tension coefficient is inversely proportional to the thickness of the interphase, (ii) the polymeric chain-ends concentrate in the interphase, and (iii) low molecular weight components are forced by the thermodynamics to the interphase. These observations are believed to hold in any system. Efficiency of a block copolymer is limited by copolymer dissolution in the two phases, as well as formation of micelles. Hence, effective compatibilization by addition requires that the copolymer branches are short, just above the entanglement molecular weight. One theory predicts that the dispersed particles' size and the interfacial tension coefficient follow the same mathematical function. The reactive compatibilization produces the compatibilizing copolymer directly on the interface. Thus, here it is important that the copolymer stays at the interface, without dissolving in the two polymers and/or forming micellar meso-phases. In other words, the efficient reactive compatibilization should lead to high molecular weight copolymers. In previous years, polyvinylacetate blends with a multicomponent acrylic copolymer containing maleic anhydride were prepared by reactive process. The reactive compatibilization is a rapid, heterogeneous reaction that takes place across the phase boundary. Most often the reaction takes place directly between chemically active groups attached to the two polymers, but in some cases a third reactive species must be added to promote the copolymer formation.

It is known in some instances to use block copolymers as compatibilizers. For example, several studies have shown attempts to compatibilize rubber-rubber blends of polyisoprene and polybutadiene by using diblock materials composed of these two materials. See R. Cohen et al. Macromolecules 15, 370, 1982; Macromolecules 12, 131, 1979; J. Polym. Sci., Polym. Phys. 18, 2148, 1980; J. Macromol. Sci.-Phys. B17 (4), 625, 1980. Most of these block copolymers have been previously produced by sequential anionic polymerization processes, which are thus limited to a relatively small number of monomers. It is also known to compatibilize other blends, such as rubber-plastic blends of ethylene-propylene rubber with polypropylene, by using graft copolymers of these two materials. See A. Y. Coran et al., U.S. Pat. No. 4,299,931 and U.S. Pat. No. 4,999,403.

Various methods have been reported to successfully enhance compatibility (see Xanthos, M. and S. S. Dagli, Compatibilization of Polymer Blends by Reactive Processing, in Polym. Eng. Sci., 1991, p. 929-35 and the articles cited there for an overview of the technology.) Reactive processing has long been recognized as means for attaining compatibility of polymeric blending partners. Enhancement of compatibility is known to be attained by forming copolymers, using reactive processing, such as graft or block copolymers with segments capable of specific interactions and/or chemical reactions with the blend components that would otherwise be incompatible. The review article referred to above points to continuous reactive processing, in particular, extrusion, as means to providing compatibilization of polymer blends through reactions during compounding. U.S. Pat. No. 3,856,886 disclosed thermoplastic graft copolymers wherein polymeric backbone contains aromatic hydroxy groups and where aromatic polycarbonate is grafted onto the backbone via the aromatic hydroxy groups. The disclosed graft copolymers are said to form blends with polycarbonate and/or with polymers of olefinically unsaturated monomers.

The compatibilizers within the scope of the present invention include traditional block copolymers and reactive polymers to form compatibilizer insitu. The compatibilizer can be block or graft copolymer in type. In the broadest sense, the compatibilizers useful in this invention can be miscible or immiscible, reactive or non-reactive, with the hard or soft components described herein. It is preferred that the compatibilizers of this invention are reactive in nature. In one embodiment, the compatibilizer is miscible in one of the polymer components of this invention and reactive with the other. An excellent review of compatibilizers of these types are found in Polymer Blends Vol. 1 by D. R. Paul and C. B. Bucknall, 2000. An example of an effective block copolymer would comprise blocks of the same "hard" and "soft" polymers disclosed herein, where this block would reside at the interface of the blend of said "hard" and "soft" polymers. In general any blockA-co-blockB copolymer where blockA is miscible or compatible with the "hard" polymer and blockB is miscible or compatible with the "hard" polymer would be considered suitable. Reactive compatibilizers are typically, but not always, miscible with one phase of the blend and will react with some species in the other phase of the blend to create this type of block copolymer insitu. Although not limited, it is preferred that these "reactive compatibilizers" are comprising monomers which are broadly characterized as ethylenically unsaturated monomers. These include, but are not limited to, non-acid vinyl monomers, acid vinyl monomers and/or mixtures thereof and their derivatives. Suitable non-acid vinyl monomers that may be used to prepare the latex polymer include, but are not limited to, acetoacetoxy ethyl methacrylate, acetoacetoxy ethyl acrylate, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethyl hexyl acrylate, isoprene, octyl acrylate, octyl methacrylate, iso-octyl acrylate, iso-octyl methacrylate, trimethyolpropyl triacrylate, styrene, -methyl styrene, glycidyl methacrylate (or any epoxy functional acrylate), carbodiimide methacrylate, $C_1$-$C_{18}$ alkyl crotonates, di-n-butyl maleate, or - -vinyl naphthalene, di-octylmaleate, allyl methacrylate, di-allyl maleate, di-allylmalonate, methyoxybutenyl methacrylate, isobornyl methacrylate, hydroxybutenyl methacrylate, hydroxyethyl(meth)acrylate, hydroxypropyl(meth)acrylate, acrylonitrile, vinyl chloride, vinylidene chloride, vinyl acetate, vinyl ethylene carbonate, epoxy butene, 3,4-dihydroxybutene, hydroxyethyl(meth)acrylate (or any hydroxyl functional acrylate), methacrylamide, acrylamide, butyl acrylamide, ethyl acrylamide, butadiene, vinyl ester monomers, vinyl(meth)acrylates, isopropenyl(meth)acrylate, cycloaliphaticepoxy(meth)acrylates, ethylformamide, 4-vinyl-1,3-dioxolan-2-one, 2,2-dimethyl-4 vinyl-1,3-dioxolane, and 3,4-di-acetoxy-1-butene or a mixture thereof. Acid vinyl monomers that may be used to prepare the latex polymer include, but are not limited to, acrylic acid, methacrylic acid, itaconic acid, crotonic acid, and monovinyl adipate. Suitable monomers are described in "The Brandon Associates," 2nd edition, 1992 Merrimack, New Hampshire, and in "Polymers and Monomers," the 1966-1997 Catalog from Polyscience, Inc., Warrington, Pa., U.S.A.

Preferred compatibilizers are polyacrylates miscible with polylactic acid. The most preferred compatibilizers are copolymers containing methylmethacrylate and/or containing glycidyl methacrylate.

It is within the scope of the invention to also include a variety of natural polymers and their derivatives, such as polymers and derivatives derived from starch, cellulose, other polysaccharides and proteins. It is also within the scope of the present invention to incorporate inorganic fillers in order to decrease self-adhesion, lower the cost, and increase the modulus of elasticity (Young's modulus) of the polymer blends. In addition, a wide variety of plasticizers may be used in order to impart desired softening and elongation properties.

The copolyester composition also may comprise a phosphorus-containing flame retardant, although the presence of a flame retardant is not critical to the invention. The flame retardant may comprise a wide range of phosphorus compounds well-known in the art such as, for example, phosphines, phosphites, phosphinites, phosphonites, phosphinates, phosphonates, phosphine oxides, and phosphates.

Examples of phosphorus-containing flame retardants include tributyl phosphate, triethyl phosphate, tri-butoxyethyl phosphate, t-butylphenyl diphenyl phosphate, 2-ethylhexyl diphenyl phosphate, ethyl dimethyl phosphate, isodecyl diphenyl phosphate, trilauryl phosphate, triphenyl phosphate, tricresyl phosphate, trixylenyl phosphate, t-butylphenyl diphenylphosphate, resorcinol bis(diphenyl phosphate), tribenzyl phosphate, phenyl ethyl phosphate, trimethyl thionophosphate, phenyl ethyl thionophosphate, dimethyl methylphosphonate, diethyl methylphosphonate, diethyl pentylphosphonate, dilauryl methylphosphonate, diphenyl methylphosphonate, dibenzyl methylphosphonate, diphenyl cresylphosphonate, dimethyl cresylphosphonate, dimethyl methylthionophosphonate, phenyl diphenylphosphinate, benzyl diphenylphosphinate, methyl diphenylphosphinate, trimethyl phosphine oxide, triphenyl phosphine oxide, tribenzyl phosphine oxide, 4-methyl diphenyl phosphine oxide, triethyl phosphite, tributyl phosphite, trilauryl phosphite, triphenyl phosphite, tribenzyl phosphite, phenyl diethyl phosphite, phenyl dimethyl phosphite, benzyl dimethyl phosphite, dimethyl methylphosphonite, diethyl pentylphosphonite, diphenyl methylphosphonite, dibenzyl methylphosphonite, dimethyl cresylphosphonite, methyl dimethylphosphinite, methyl diethylphosphinite, phenyl diphenylphosphinite, methyl diphenylphosphinite, benzyl diphenylphosphinite, triphenyl phosphine, tribenzyl phosphine, and methyl diphenyl phosphine.

The term "phosphorus acid" as used in describing the phosphorus-containing flame retardants useful in the invention include the mineral acids such as phosphoric acid, acids having direct carbon-to-phosphorus bonds such as the phosphonic and phosphinic acids, and partially esterified phosphorus acids which contain at least one remaining unesterified acid group such as the first and second degree esters of phosphoric acid and the like. Typical phosphorus acids that can be employed in the present invention include, but are not limited to: dibenzyl phosphoric acid, dibutyl phosphoric acid, di(2-ethylhexyl) phosphoric acid, diphenyl phosphoric acid, methyl phenyl phosphoric acid, phenyl benzyl phosphoric acid, hexylphosphonic acid, phenylphosphonic acid tolylphosphonic acid, benzylphosphonic acid, 2-phenylethylphosphonic acid, methylhexylphosphinic acid, diphenylphosphinic acid, phenylnaphthylphosphinic acid, dibenzylphosphinic acid, methylphenylphosphinic acid, phenylphosphonous acid, tolylphosphonous acid, benzylphosphonous acid, butyl phosphoric acid, 2-ethyl hexyl phosphoric acid, phenyl phosphoric acid, cresyl phosphoric acid, benzyl phosphoric acid, phenyl phosphorous acid, cresyl phosphorous acid, benzyl phosphorous acid, diphenyl phosphorous acid, phenyl benzyl phosphorous acid, dibenzyl phosphorous acid, methyl phenyl phosphorous acid, phenyl phenylphosphonic acid, tolyl methylphosphonic acid, ethyl benzylphosphonic acid, methyl ethylphosphonous acid, methyl phenylphosphonous acid, and phenyl phenylphosphonous acid. The flame retardant typically comprises one or more monoesters, diesters, or triesters of phosphoric acid. In another example, the flame retardant comprises resorcinol bis(diphenyl phosphate), abbreviated herein as "RDP".

The flame retardant may be added to the polymer blends at a concentration of about 5 weight % to about 40 weight % based on the total weight of the copolyester composition. Other embodiments of the flame retardant levels are about 7 weight % to about 35 weight %, about 10 weight % to about 30 weight %, and about 10 weight % to about 25 weight %. The flame retardant copolyester compositions of the present invention typically give a V2 or greater rating in a UL94 burn test. In addition, our flame retardant copolyester compositions typically give a burn rate of 0 in the Federal Motor Vehicle Safety Standard 302 (typically referred to as FMVSS 302).

Oxidative stabilizers also may be included in the polymer blends of the present invention to prevent oxidative degradation during processing of the molten or semi-molten material on the rolls. Such stabilizers include but are not limited to esters such as distearyl thiodipropionate or dilauryl thiodipropionate; phenolic stabilizers such as IRGANOX® 1010 available from Ciba-Geigy AG, ETHANOX® 330 available from Ethyl Corporation, and butylated hydroxytoluene; and phosphorus containing stabilizers such as Irgafos® available from Ciba-Geigy AG and WESTON® stabilizers available from GE Specialty Chemicals. These stabilizers may be used alone or in combinations.

In addition, the polymer blends may contain dyes, pigments, and processing aids such as, for example, fillers, matting agents, antiblocking agents, antistatic agents, blowing agents, chopped fibers, glass, impact modifiers, carbon black, talc, TiO2 and the like as desired. Colorants, sometimes referred to as toners, may be added to impart a desired neutral hue and/or brightness to the copolyester and the end-use product.

Preferably, the copolyester compositions also may comprise 0 to about 30 weight % of one or more processing aids to alter the surface properties of the composition and/or to enhance flow. Representative examples of processing aids include calcium carbonate, talc, clay, TiO2, NH4Cl, silica, calcium oxide, sodium sulfate, and calcium phosphate. Further examples of processing aid amounts within the copolyester composition of the instant invention are about 5 to about 25 weight % and about 10 to about 20 weight %. Preferably, the processing aid is also a biodegradation accelerant, that is, the processing aid increases or accelerates the rate of biodegradation in the environment. In the context of the invention, it has been discovered that processing aids that also may function to alter the pH of the composting environment such as, for example, calcium carbonate, calcium hydroxide, calcium oxide, barium oxide, barium hydroxide, sodium silicate, calcium phosphate, magnesium oxide, and the like may also accelerate the biodegradation process. For the present invention, the preferred processing aid is calcium carbonate.

The polymers (A) and (B) of the invention are biodegradable and also may contain biodegradable additives to enhance their disintegration and biodegradability in the environment. The copolyester compositions may comprise about 1 to about 50 weight % of a biodegradable additive. Other examples of biodegradable additive levels are about 5 to about 25 weight % and about 10 to about 20 weight %. One effect of such additives is to increase the biodegradability of the copolyester composition and to compensate for reduced biodegradability resulting from high concentrations of various additives.

Representative examples of the biodegradable additives which may be included in the copolyester compositions of this invention include microcrystalline cellulose, polylactic acid, polyhydroxybutyrate, polyhydroxyvalerate, polyvinyl alcohol, thermoplastic starch or other carbohydrates, or combination thereof. Preferably, the biodegradable additive is a thermoplastic starch. A thermoplastic starch is a starch that has been gelatinized by extrusion cooking to impart a disorganized crystalline structure. As used herein, thermoplastic starch is intended to include "destructured starch" as well as "gelatinized starch", as described, for example, in Bastioli, C. Degradable Polymers, 1995, Chapman & Hall: London, pages 112-137. By gelatinized, it is meant that the starch granules are sufficiently swollen and disrupted that they form a smooth viscous dispersion in the water. Gelatinization is effected by any known procedure such as heating in the presence of water or an aqueous solution at temperatures of about 60° C. The presence of strong alkali is known to facilitate this process. The thermoplastic starch may be prepared from any unmodified starch from cereal grains or root crops such as corn, wheat, rice, potato, and tapioca, from the amylose and amylopectin components of starch, from modified starch products such as partially depolymerized starches and derivatized starches, and also from starch graft copolymers. Thermoplastic starches are commercially available from National Starch Company.

The various components of the copolyester compositions such as, for example, the flame retardant, release additive, other processing aids, and toners, may be blended in batch, semicontinuous, or continuous processes. Small scale batches may be readily prepared in any high-intensity mixing devices well-known to those skilled in the art, such as Banbury mixers, prior calendering. The components also may be blended in solution in an appropriate solvent. The melt blending method includes blending the copolyester, additive, and any additional non-polymerized components at a temperature sufficient to melt the copolyester. The blend may be cooled and pelletized for further use or the melt blend can be calendered directly from this molten blend into film or sheet. The term "melt" as used herein includes, but is not limited to, merely softening the AAPE. For melt mixing methods generally known in the polymer art, see "Mixing and Compounding of Polymers" (I. Manas-Zloczower & Z. Tadmor editors, Carl Hanser Verlag Publisher, 1994, New York, N.Y.). When colored sheet or film is desired, pigments or colorants may be included in the copolyester coposition during the reaction of the diol and the dicarboxylic acid or they may be melt blended with the preformed copolyester. A preferred method of including colorants is to use a colorant having thermally stable organic colored compounds having reactive groups such that the colorant is copolymerized and incorporated into the copolyester to improve its hue. For example, colorants such as dyes possessing reactive hydroxyl and/or carboxyl groups, including, but not limited to, blue and red substituted anthraquinones, may be copolymerized into the polymer chain. When dyes are employed as colorants, they may be added to the copolyester reaction process after an ester interchange or direct esterification reaction.

The polymer compositions of the invention may also comprise a plasticizer. The presence of the plasticizer is useful to enhance flexibility and the good mechanical properties of the resultant film or sheet. The plasticizer also helps to lower the processing temperature of the polyesters. The plasticizers typically comprise one or more aromatic rings. The preferred plasticizers are soluble in the polyester as indicated by dissolving a 5-mil (0.127 mm) thick film of the polyester to produce a clear solution at a temperature of 160° C. or less. More preferably, the plasticizers are soluble in the polyester as indicated by dissolving a 5-mil (0.127 mm) thick film of the polyester to produce a clear solution at a temperature of 150° C. or less. The solubility of the plasticizer in the polyester may be determined as follows:

1. Placing into a small vial a ½ inch section of a standard reference film, 5 mils (0.127 mm) in thickness and about equal to the width of the vial.
2. Adding the plasticizer to the vial until the film is covered completely.
3. Placing the vial with the film and plasticizer on a shelf to observe after one hour and again at 4 hours. Note the appearance of the film and liquid.
4. After the ambient observation, placing the vial in a heating block and allow the temperature to remain constant at 75° C. for one hour and observe the appearance of the film and liquid.
5. Repeating step 4 for each of the following temperatures (° C.): 100, 140, 150, and 160.

Examples of plasticizers potentially useful in the invention are as follows:

TABLE A

| Plasticizers |
|---|
| Adipic Acid Derivatives |
| Dicapryl adipate |
| Di-(2-ethylhexyl adipate) |
| Di(n-heptyl, n-nonyl) adipate |
| Diisobutyl adipate |
| Diisodecyl adipate |
| Dinonyl adipate |
| Di-(tridecyl) adipate |
| Azelaic Acid Derivatives |
| Di-(2-ethylhexyl) azelate |
| Diisodecyl azelate |
| Diisoctyl azealate |
| Dimethyl azelate |
| Di-n-hexyl azelate |
| Benzoic Acid Derivatives |
| Diethylene glycol dibenzoate (DEGDB) |
| Dipropylene glycol dibenzoate |
| Propylene glycol dibenzoate |
| Polyethylene glycol 200 dibenzoate |
| Neopentyl glycol dibenzoate |
| Citric Acid Derivatives |
| Acetyl tri-n-butyl citrate |
| Acetyl triethyl citrate |
| Tri-n-Butyl citrate |
| Triethyl citrate |
| Dimer Acid Derivatives |
| Bis-(2-hydroxyethyl dimerate) |

TABLE A-continued

Plasticizers

Epoxy Derivatives

Epoxidized linseed oil
Epoxidized soy bean oil
2-Ethylhexyl epoxytallate
Fumaric Acid Derivatives Dibutyl fumarate
Glycerol Derivatives Glycerol Tribenzoate
Glycerol triacetate
Glycerol diacetate monolaurate
Isobutyrate Derivative 2,2,4-Trimethyl-1,3-pentanediol,
Diisobutyrate
Texanol diisobutyrate
Isophthalic Acid Derivatives Dimethyl isophthalate
Diphenyl isophthalate
Di-n-butylphthalate
Lauric Acid Derivatives Methyl laurate
Linoleic Acid Derivative Methyl linoleate, 75%
Maleic Acid Derivatives Di-(2-ethylhexyl) maleate
Di-n-butyl maleate
Mellitates Tricapryl trimellitate
Triisodecyl trimellitate
Tri-(n-octyl,n-decyl) trimellitate
Triisonyl trimellitate
Myristic Acid Derivatives Isopropyl myristate
Oleic Acid Derivatives Butyl oleate
Glycerol monooleate
Glycerol trioleate
Methyl oleate
n-Propyl oleate
Tetrahydrofurfuryl oleate
Palmitic Acid Derivatives Isopropyl palmitate
Methyl palmitate
Paraffin Derivatives Chloroparaffin, 41% C1
Chloroparaffin, 50% C1
Chloroparaffin, 60% C1
Chloroparaffin, 70% C1
Phosphoric Acid Derivatives 2-Ethylhexyl diphenyl phosphate
Isodecyl diphenyl phosphate
t-Butylphenyl diphenyl phosphate
Resorcinol bis(diphenyl phosphate) (RDP)
100% RDP
Blend of 75% RDP, 25% DEGDB (by wt)
Blend of 50% RDP, 50% DEGDB (by wt)
Blend of 25% RDP, 75% DEGDB (by wt)
Tri-butoxyethyl phosphate
Tributyl phosphate
Tricresyl phosphate
Triphenyl phosphate

TABLE A-continued

Plasticizers

Phthalic Acid Derivatives

Butyl benzyl phthalate
Texanol benzyl phthalate
Butyl octyl phthalate
Dicapryl phthalate
Dicyclohexyl phthalate
Di-(2-ethylhexyl) phthalate
Diethyl phthalate
Dihexyl phthalate
Diisobutyl phthalate
Diisodecyl phthalate
Diisoheptyl phthalate
Diisononyl phthalate
Diisooctyl phthalate
Dimethyl phthalate
Ditridecyl phthalate
Diundecyl phthalate
Ricinoleic Acid Derivatives Butyl ricinoleate
Glycerol tri(acetyl) ricinlloeate
Methyl acetyl ricinlloeate
Methyl ricinlloeate
n-Butyl acetyl ricinlloeate
Propylene glycol ricinlloeate
Sebacic Acid Derivatives Dibutyl sebacate
Di-(2-ethylhexyl) sebacate
Dimethyl sebacate
Stearic Acid Derivatives Ethylene glycol monostearate
Glycerol monostearate
Isopropyl isostearate
Methyl stearate
n-Butyl stearate
Propylene glycol monostearate
Succinic Acid Derivatives Diethyl succinate
Sulfonic Acid Derivatives N-Ethyl o,p-toluenesulfonamide
o,p-toluenesulfonamide Solubility of the plasticizers in AAPE's also can be predicted using solubility parameter determinations as described by Michael M. Coleman, John E. Graf, and Paul C. Painter, in their book, Specific Interactions and the Miscibility of Polymer Blends. In this book, solubility values were ascribed to various plasticizers in the test. A solubility value can be ascribed to EASTAR™ BIO of 10.17 $(cal/cc)^{1/2}$. Evaluation of the experimental data by Coleman and others, with a comparison to solubility values of each plasticizer suggests that if a solvent/plasticizer falls within 2 $(cal/cc)^{1/2}$ plus or minus of the value ascribed for the polymer, that the solvent/plasticizer will be compatible at some level with the polymer. Furthermore, the closer a plasticizer solubility values is to that of the AAPE copolyester, the more compatible it would be. However, solubility parameters are not absolute as that many forces are acting in conjunction when two molecules meet, especially as that the plasticizer/solvent is extremely small in comparison to the macromolecule of a polymer and simply that there are some that are not purely the named material. For instance, in the case of dipropylene glycol dibenzoate, the commercially prepared material may include levels of dipropylene glycol monobenzoate, propylene glycol dibenzoate and its monobenzoate as well as the potential for multiple polypropylene glycol groups.

A similar test to that above is described in The Technology of Plasticizers, by J. Kern Sears and Joseph R. Darby, published by Society of Plastic Engineers/Wiley and Sons, New York, 1982, pp 136-137. In this test, a grain of the polymer is placed in a drop of plasticizer on a heated microscope stage. If the polymer disappears, then it is solubilized. The plasticizers can also be classified according to their solubility parameter. The solubility parameter, or square root of the cohesive energy density, of a plasticizer can be calculated by the method described by Coleman et al., Polymer 31, 1187 (1990). The most preferred plasticizers will have a solubility parameter ($\delta$) in the range of about 8.17 to about 9.17 $2(cal/cc)^{1/2}$. 13.0 cal 0.5 cm−1.5. It is generally understood that the solubility parameter of the plasticizer should be within 2.0 units of the solubility parameter of the polyester, preferably less than 1.5 unit from the solubility parameter of the polyester, and more preferably, less than 1.0 unit of the solubility parameter of the polyester.

Examples of plasticizers which may be used according to the invention are esters comprising: (i) acid residues comprising one or more residues of: phthalic acid, adipic acid, trimellitic acid, benzoic acid, azelaic acid, terephthalic acid, isophthalic acid, butyric acid, glutaric acid, citric acid or phosphoric acid; and (ii) alcohol residues comprising one or more residues of an aliphatic, cycloaliphatic, or aromatic alcohol containing up to about 20 carbon atoms. Further, non-limiting examples of alcohol residues of the plasticizer include methanol, ethanol, propanol, isopropanol, butanol, isobutanol, stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol. The plasticizer also may comprise one or more benzoates, phthalates, phosphates, or isophthalates.

In one embodiment, the preferred plasticizers are selected from the group consisting of N-ethyl-o,p-toluenesulfonamide, 2-ethylhexyl diphenyl phosphate, isodecyl diphenyl phosphate, tributyl phosphate, t-butylphenyl diphenyl phosphate, tricresyl phosphate, chloroparaffin (60% chlorine), chloroparaffin (50% chlorine), diethyl succinate, di-n-butyl maleate, di-(2-ethylhexyl) maleate, n-butyl stearate, acetyl triethyl citrate, triethyl citrate, tri-n-butyl citrate, acetyl tri-n-butyl citrate, methyl oleate, dibutyl fumarate, diisobutyl adipate, dimethyl azelate, epoxidized linseed oil, glycerol monooleate, methyl acetyl ricinloeate, n-butyl acetyl ricinloeate, propylene glycol ricinloeate, polyethylene glycol 200 dibenzoate, diethylene glycol dibenzoate, dipropylene glycol dibenzoate, dimethyl phthalate, diethyl phthalate, di-n-butylphthalate, diisobutyl phthalate, butyl benzyl phthalate, and glycerol triacetate.

In a second embodiment, the preferred plasticizers are selected from the group consisting of N-ethyl-o,p-toluenesulfonamide, 2-ethylhexyl diphenyl phosphate, isodecyl diphenyl phosphate, tributyl phosphate, t-butylphenyl diphenyl phosphate, tricresyl phosphate, chloroparaffin (60% chlorine), chloroparaffin (50% chlorine), diethyl succinate, di-n-butyl maleate, di-(2-ethylhexyl) maleate, n-butyl stearate, acetyl triethyl citrate, triethyl citrate, tri-n-butyl citrate, dimethyl azelate, polyethylene glycol 200 dibenzoate, diethylene glycol dibenzoate, dipropylene glycol dibenzoate, dimethyl phthalate, diethyl phthalate, di-n-butylphthalate, diisobutyl phthalate, butyl benzyl phthalate, or glycerol triacetate.

In a third embodiment, the preferred plasticizers are selected from the group consisting of N-ethyl-o,p-toluenesulfonamide, 2-ethylhexyl diphenyl phosphate, isodecyl diphenyl phosphate, t-butylphenyl diphenyl phosphate, tri-cresyl phosphate, chloroparaffin (60% chlorine), chloroparaffin (50% chlorine), diethyl succinate, di-n-butyl maleate, n-butyl stearate, polyethylene glycol 200 dibenzoate, diethylene glycol dibenzoate, dipropylene glycol dibenzoate, dimethyl phthalate, diethyl phthalate, di-n-butylphthalate, diisobutyl phthalate, or butyl benzyl phthalate.

In a fourth embodiment, the preferred plasticizers are selected from the group consisting of N-ethyl-o,p-toluenesulfonamide, 2-ethylhexyl diphenyl phosphate, isodecyl diphenyl phosphate, t-butylphenyl diphenyl phosphate, tricresyl phosphate, chloroparaffin (60% chlorine), polyethylene glycol 200 dibenzoate, diethylene glycol dibenzoate, dipropylene glycol dibenzoate, dimethyl phthalate, diethyl phthalate, di-n-butylphthalate, or butyl benzyl phthalate.

In a fifth embodiment, the preferred plasticizers are selected from the group consisting of N-ethyl-o,p-toluenesulfonamide, t-butylphenyl diphenyl phosphate, tricresyl phosphate, diethylene glycol dibenzoate, dipropylene glycol dibenzoate, dimethyl phthalate, diethyl phthalate, or butyl benzyl phthalate.

In a sixth embodiment, the preferred plasticizers are selected from the group consisting of N-ethyl-o,p-toluenesulfonamide, diethylene glycol dibenzoate, dipropylene glycol dibenzoate, or dimethyl phthalate.

In a seventh embodiment, diethylene glycol dibenzoate is the preferred plasticizer.

By the term "biodegradable", as used herein in reference to the AAPE's, polymers (A) and (B), polymer blends, film and sheet, flame retardants, and additives of the present invention, means that polyester compositions, film, and sheet of this invention are degraded under environmental influences in an appropriate and demonstrable time span as defined, for example, by ASTM Standard Method, D6340-98, entitled "Standard Test Methods for Determining Aerobic Biodegradation of Radiolabeled Plastic Materials in an Aqueous or Compost Environment". The AAPE's, polymers (A) and (B), film and sheet, flame retardants, and additives of the present invention also may be "biodisintegradable", meaning that these materials are easily fragmented in a composting environment as determined by DIN Method 54900. The AAPE, composition, film and sheet, are initially reduced in molecular weight in the environment by the action of heat, water, air, microbes and other factors. This reduction in molecular weight results in a loss of physical properties (film strength) and often in film breakage. Once the molecular weight of the AAPE is sufficiently low, the monomers and oligomers are then assimilated by the microbes. In an aerobic environment, these monomers or oligomers are ultimately oxidized to CO2, H2O, and new cell biomass. In an anaerobic environment, the monomers or oligomers are ultimately oxidized to CO2, H2, acetate, methane, and cell biomass. Successful biodegradation requires that direct physical contact must be established between the biodegradable material and the active microbial population or the enzymes produced by the active microbial population. An active microbial population useful for degrading the films, copolyesters, and copolyester compositions of the invention can generally be obtained from any municipal or industrial wastewater treatment facility or composting facility. Moreover, successful biodegradation requires that certain minimal physical and chemical requirements be met such as suitable pH, temperature, oxygen concentration, proper nutrients, and moisture level.

Composting can be defined as the microbial degradation and conversion of solid organic waste into soil. One of the key characteristics of compost piles is that they are self heating; heat is a natural by-product of the metabolic break down of organic matter. Depending upon the size of the pile, or its ability to insulate, the heat can be trapped and cause the internal temperature to rise. Efficient degradation within compost piles relies upon a natural progression or succession of microbial populations to occur. Initially the microbial population of the compost is dominated by mesophilic species (optimal growth temperatures between 20 and 45° C.).

The process begins with the proliferation of the indigenous mesophilic microflora and metabolism of the organic matter. This results in the production of large amounts of metabolic heat which raise the internal pile temperatures to approximately 55-65° C. The higher temperature acts as a selective pressure which favors the growth of thermophilic species on one hand (optimal growth range between 45-60° C.), while inhibiting the mesophiles on the other.

Although the temperature profiles are often cyclic in nature, alternating between mesophilic and thermophilic populations, municipal compost facilities attempt to control their operational temperatures between 55-60° C. in order to obtain optimal degradation rates. Municipal compost units are also typically aerobic processes, which supply sufficient oxygen for the metabolic needs of the microorganisms permitting accelerated biodegradation rates.

There are a number of optional components which may be included within the biodegradable polymer blends of the present invention in order to impart desired properties. These include, but are not limited to, plasticizers, flame retardants, fillers, natural polymers and nonbiodegradable polymers.

Fillers may optionally be added for a number of reasons, including but not limited to, increasing the Young's modulus, and decreasing the cost and tendency of the polymer blend to "block" or self-adhere during processing. The fillers within the scope of the invention will generally fall within three classes or categories: (1) inorganic particulate fillers, (2) fibers and (3) organic fillers.

The terms "particle" or "particulate filler" should be interpreted broadly to include filler particles having any of a variety of different shapes and aspect ratios. In general, "particles" are those solids having an aspect ratio (i.e., the ratio of length to thickness) of less than about 10:1. Solids having an aspect ratio greater than about 10:1 may be better understood as "fibers", as that term will be defined and discussed hereinbelow.

Virtually any known filler, whether inert or reactive, can be incorporated into the biodegradable polymer blends. In general, adding an inorganic filler will tend to greatly reduce the cost of the resulting polymer blend. If a relatively small amount of inorganic filler is used, the effects on the strength of the final composition are minimized, while adding a relatively large amount of inorganic filler will tend to maximize those effects. In those cases where adding the inorganic filler will tend to detract from a critical physical parameter, such as tensile strength or flexibility, only so much of the filler should be added in order to reduce the cost of the resulting composition while retaining adequate mechanical properties required by the intended use. However, in those cases where adding the inorganic filler will improve one or more desired physical properties of a given application, such as stiffness, compressive strength, it may be desirable to maximize the quantity of added filler in order to provide this desired property while also proving greatly decreased cost.

Examples of useful inorganic fillers that may be included within the biodegradable polymer blends include such disparate materials as sand, gravel, crushed rock, bauxite, granite, limestone, sandstone, glass beads, aerogels, xerogels, mica, clay, alumina, silica, kaolin, microspheres, hollow glass spheres, porous ceramic spheres, gypsum dihydrate, insoluble salts, calcium carbonate, magnesium carbonate, calcium hydroxide, calcium aluminate, magnesium carbonate, titanium dioxide, talc, ceramic materials, pozzolanic materials, salts, zirconium compounds, xonotlite (a crystalline calcium silicate gel), lightweight expanded clays, perlite, vermiculite, hydrated or unhydrated hydraulic cement particles, pumice, zeolites, exfoliated rock, ores, minerals, and other geologic materials. A wide variety of other inorganic fillers may be added to the polymer blends, including materials such as metals and metal alloys (e.g., stainless steel, iron, and copper), balls or hollow spherical materials (such as glass, polymers, and metals), filings, pellets, flakes and powders (such as microsilica).

The particle size or range of particle sizes of the inorganic fillers will depend on the wall thickness of the film, sheet, or other article that is to be manufactured from the polymer blend. In general, the larger the wall thickness, the larger will be the acceptable particle size. In most cases, it will be preferable to maximize the particle size within the acceptable range of particle sizes for a given application in order to reduce the cost and specific surface area of the inorganic filler. For films that are intended to have a substantial amount of flexibility, tensile strength and bending endurance (e.g., plastic bags) the particle size of the inorganic filler will preferably be less than about 10% of the wall thickness of the film. For example, for a blown film having a thickness of 40 microns, it will be preferable for the inorganic filler particles to have a particle size of about 4 microns or less.

The amount of particulate filler added to a polymer blend will depend on a variety of factors, including the quantity and identities of the other added components, as well as the specific surface area and/or packing density of the filler particles themselves. Accordingly, the concentration of particulate filler within the polymer blends of the present invention may be included in a broad range from as low as about 5% by volume to as high as about 90% by volume of the polymer blend. Because of the variations in density of the various inorganic fillers than can be used, it may be more correct in some instances to express the concentration of the inorganic filler in terms of weight percent rather than volume percent. In view of this, the inorganic filler components can be included within a broad range from as low as 5% by weight to as high as 95% by weight of the polymer blend.

In those cases where it is desired for the properties of the thermoplastic phase to predominate due to the required performance criteria of the articles being manufactured, the inorganic filler will preferably be included in an amount in a range from about 5% to about 50% by volume of polymer blend. On the other hand, where it is desired to create highly inorganically filled systems, the inorganic filler will preferably be included in an amount in a range from about 50% to about 90% by volume.

In light of these competing objectives, the actual preferred quantity of inorganic filler may vary widely. In general terms, however, in order to appreciably decrease the cost of the resulting polymer blend, the inorganic filler component will preferably be included in an amount greater than about 15% by weight of the polymer blend, more preferably in an amount greater than about 25% by weight, more especially preferably in an amount greater than about 35% by weight, and most preferably in an amount greater than about 50% by weight of the polymer blend. However, the inorganic filler may be included in any amount, such as in an amount greater than about 3% by weight, preferably greater than about 5% by weight, and more preferably greater than about 10% of the polymer blend.

A wide range of fibers can optionally be used in order to improve the physical properties of the polymer blends. Like the aforementioned fillers, fibers will typically constitute a solid phase that is separate and distinct from the thermoplastic phase. However, because of the shape of fibers, i.e., by having an aspect ratio greater than at least about 10:1, they are better able to impart strength and toughness than particulate fillers. As used in the specification and the appended claims, the terms "fibers" and "fibrous material" include both inorganic fibers and organic fibers. Fibers may be added to the moldable mixture to increase the flexibility, ductility, bendability, cohesion, elongation ability, deflection ability, toughness, dead-fold, and fracture energy, as well as the flexural and tensile strengths of the resulting sheets and articles.

Fibers that may be incorporated into the polymer blends include naturally occurring organic fibers, such as cellulosic fibers extracted from wood, plant leaves, and plant stems. In addition, inorganic fibers made from glass, graphite, silica, ceramic, rock wool, or metal materials may also be used. Preferred fibers include cotton, wood fibers (both hardwood or softwood fibers, examples of which include southern hardwood and southern pine), flax, abaca, sisal, ramie, hemp, and bagasse because they readily decompose under normal conditions. Even recycled paper fibers can be used in many cases and are extremely inexpensive and plentiful. The fibers may include one or more filaments, fabrics, mesh or mats, and which may be co-extruded, or otherwise blended with or impregnated into, the polymer blends of the present invention.

The fibers used in making the articles of the present invention preferably have a high length to width ratio (or "aspect ratio") because longer, narrower fibers can impart more strength to the polymer blend while adding significantly less bulk and mass to the matrix than thicker fibers. The fibers will have an aspect ratio of at least about 10:1, preferably greater than about 25:1, more preferably greater than about 100:1, and most preferably greater than about 250:1.

The amount of fibers added to the polymer blends will vary depending upon the desired properties of the final molded article, with tensile strength, toughness, flexibility, and cost being the principle criteria for determining the amount of fiber to be added in any mix design. Accordingly, the concentration of fibers within the polymer blends of the present invention can be included in a broad range from 0% to about 90% by weight of the polymer blend. Preferably, fibers will be included in an amount in a range from about 3% to about 80% by weight of the polymer blend, more preferably in a range from about 5% to about 60% by weight, and even more preferably, in a range from about 10% to about 30% by weight of the polymer blend.

The polymer blends of the present invention may also include a wide range of organic fillers. Depending on the melting points of the polymer blend and organic filler being added, the organic filler may remain as a discrete particle and constitute a solid phase separate from the thermoplastic phase, or it may partially or wholly melt and become partially or wholly associated with the thermoplastic phase.

Organic fillers may comprise a wide variety of natural occurring organic fillers such as, for example, seagel, cork, seeds, gelatins, wood flour, saw dust, milled polymeric materials, agar-based materials, and the like. Organic fillers may also include one or more synthetic polymers of which there is virtually endless variety. Because of the diverse nature of organic fillers, there will not generally be a preferred concentration range for the optional organic filler component.

Natural polymers may be used within the polymer blends of the present invention including derivatives of starch and cellulose, proteins and derivatives thereof, and other polysaccharides such as polysaccharide gums and derivatives thereof, some of which are described in this application as biodegradable additives.

Examples of starch derivatives include, but are not limited to, modified starches, cationic and anionic starches, and starch esters such as starch acetate, starch hydroxyethyl ether, alkyl starches, dextrins, amine starches, phosphates starches, and dialdehyde starches.

Examples of derivatives of cellulose include, but are not limited to, cellulosic esters (e.g., cellulose formate, cellulose acetate, cellulose diacetate, cellulose propionate, cellulose butyrate, cellulose valerate, mixed esters, and mixtures thereof) and cellulosic ethers (e.g., methylhydroxyethylcellulose, hydroxymethylethylcellulose, carboxymethylcellulose, methylcellulose, ethylcellulose, hydroxyethylcellulose, hydroxyethylpropylcellulose, and mixtures thereof).

Other polysaccharide-based polymers that can be incorporated into the polymer blends of the invention include alginic acid, alginates, phycocolloids, agar, gum arabic, guar gum, acacia gum, carrageenan gum, flircellaran gum, ghatti gum, psyllium gum, quince gum, tamarind gum, locust bean gum, gum karaya, xanthan gum, and gum tragacanth, and mixtures or derivatives thereof.

Suitable protein-based polymers include, for example, Zein.RTM. (a prolamine derived from corn), collagen (extracted from animal connective tissue and bones) and derivatives thereof such as gelatin and glue, casein (the principle protein in cow milk), sunflower protein, egg protein, soybean protein, vegetable gelatins, gluten and mixtures or derivatives thereof.

Although an important feature of the polymer blends is that they are generally considered to be biodegradable, it is certainly within the scope of the invention to include one or more polymers which are not biodegradable. If the nonbiodegradable polymer generally comprises a disperse phase rather than the dominant continuous phase, polymer blends including a nonbiodegradable polymer will nevertheless be biodegradable, at least in part. When degraded, the polymer blend may leave behind a nonbiodegradable residue that nevertheless is superior to entire sheets and films of non-biodegradable polymer.

Examples of common nonbiodegradable polymers suitable for forming sheets and films include, but are not limited to, polyethylene, polypropylene, polybutylene, polyethylene terephthalate (PET), modified PET with 1,4-cyclohexanedimethanol (PETG), polyvinyl chloride, polyvinylidene chloride(PVDC), polystyrene, polyamides, nylon, polycarbonates, polysulfides, polysulfones, copolymers including one or more of the foregoing, and the like.

This invention also includes a process for film or sheet, comprising any of the polymer blends described herein, as well as the film or sheet produced therefrom. The various embodiments of the AAPE's, branching monomers, additives, processing aids, and flame retardants have been described hereinabove. In some embodiments, a process is disclosed for making such articles, film, sheet, and/or fibers comprising the steps of injection molding, extrusion blow molding, film/sheet extruding or calendering the polymer blend(s) of the invention.

For this invention, including the Examples, the following measurements apply: The Izod impact strength is measured by ASTM method D256. Inherent viscosities (IV) are measured in dL/g at a temperature of 25° C. for a 0.5 gram sample in 100 ml of a 60/40 by weight solution of phenol/tetrachloroethane (PM95). Zero shear viscosity is measured by torque rheometry and is reported in Poise. Glass transition (Tg) and melting Tm temperatures are measured by DSC at a scan rate of 20° C./min. Abbreviations used herein are as follows: "IV" is inherent viscosity; "g" is gram; "psi" is pounds per square inch; "cc" is cubic centimeter; "m" is meter; "rpm" is revolutions per minute; "AAPE" is aliphatic aromatic copolyester and, as used herein, refers to poly (tetramethylene adipate-co-terephthalate) were the mole percent of adipate to terephthalate is 55/45. PLA is polylactic acid.

By blending a relatively rigid polymer with a relatively flexible polymer, in the presence of a compatibilizer, it has been discovered that, the impact properties of the blend containing the compatibilizer actually exceed the impact properties of the same blend without the compatibilizer. Thus, the surprising result of an unexpected synergistic effect is demonstrated in the following Examples. As will be shown in the Examples, a blend of Eastar Bio with 75 weight % PLA has an unnotched impact strength of 21 ft-lbs/in. However, adding just 1 weight % of the compatibilizer increases this value to 38 ft-lbs/in (81% increase). Further increasing the compatibilizer content to 3 weight % results in an unnotched impact strength of 46 ft-lbs/in (119% increase).

The blends of this invention are also useful as molded plastic parts, as films, as fibers, or as solid, foamed plastic objects. Examples of such parts include eyeglass frames, toothbrush handles, toys, automotive trim, tool handles, camera parts, razor parts, ink pen barrels, disposable syringes, bottles, nonwovens, food wraps, packaging films, and the like.

The invention has been described in detail with particular reference to preferred embodiments thereof, but it will be understood that variations and modifications can be effected within the spirit and scope of the invention. Moreover, all patents, patent applications (published or unpublished, foreign or domestic), literature references or other publications noted above are incorporated herein by reference for any disclosure pertinent to the practice of this invention.

EXAMPLES

The polymer blends provided by the present invention and the preparation thereof, including the preparation of representative polyesters, are further illustrated by the following examples. The glass transition temperatures (Tg's) of the blends were determined using a TA Instruments 2950 differential scanning calorimeter (DSC) at a scan rate of 20° C./minute.

In the following Examples, the blends were prepared by the general method: Blends of PLA and AAPE were prepared by compounding on a 19 mm APV Twin screw extruder. The typical procedure is as follows: Materials are dried overnight at temperatures between 60 and 70° C. to less than 50 ppm moisture content. The components were bag blended and then added at the desired rate using an AccuRate feeder through a hopper into the barrel of the extruder. The extrusion conditions are set to roughly:
Zone 1 temperature=120° C.
Zone 2 temperature=220° C.
Zone 3 temperature=220° C.
Zone 4 temperature=220° C.
Zone 5 temperature=220° C.
Melt temperature=230° C.
Screw speed=150 rpm Afterwards, the strand of material exiting the extruder were quenched in water and chopped with a pelletizer.

Blends prepared were molded on a Toyo 90 injection molding machine under the following conditions. These conditions should not be considered the ideal conditions, but are typical of those that can be used on blends of this type: Nozzle temperature=200° C.; Zone 1 temperature=200° C.; Zone 2 temperature=200° C.; Zone 3 temperature=200° C.; Zone 4 temperature=200° C.; Melt temperature=200° C.

TABLE I

Starting materials characterization

| | | | DSC (° C.) | | | | | Zero Shear Viscosity at 190° C. |
|---|---|---|---|---|---|---|---|---|
| | | | 1st heat | | Cool | 2nd heat | | |
| Material | Grade | IV | Tg | Tm | Tcc | Tg | Tm | Poise |
| AAPE | Eastar Bio Polymer | 1.061 | −31 | 50, 111 | 25 | −31 | 113 | 4323 |
| PLA | PLA 5429B | 1.388 | 63 | 151 | | 58 | | 36460 |
| Compatibilizer | Almatex PD6100 | | 71 | | | 50 | | |

Almatex PD6100 contains about 16% Glydidyl methacrylate, 35% Styrene, and the balance isomethacrylates. This material is miscible with polylactic acid.

Eastar Bio polymer is defined as containing 55 mole % adipic acid, 45 mole % terephthalic acid, and 100 mole % 1,4-butanediol, where the total mole percentages for the diacid components equals 100 mole % and the mole percentages for the diol components equals 100 mole %.

PLA 5429B is polylactic acid having the different viscosities as shown in Table I.

TABLE II

Blend Characterization

| Blend | Eastar Bio Polymer % | PLA % | % Compatibilizer | Viscosity (poise [P]) at 190° C. | | | | | Izod Impact Strength at 23° C., UnNotched [ft-lb/in] |
|---|---|---|---|---|---|---|---|---|---|
| | | | | 0 | 1 | 10 | 100 | 400 | |
| 1 | 75 | 25 | 0 | 3105 | 3089 | 2817 | 2340 | 1767 | |
| 2 | 74 | 25 | 1 | 4401 | 4234 | 3691 | 2808 | 2027 | |
| 3 | 72 | 25 | 3 | 6422 | 5984 | 5077 | 3503 | 2372 | |
| 4 | 70 | 25 | 5 | 12403 | 10949 | 8754 | 5046 | 3062 | |
| 5 | 25 | 75 | 0 | 32199 | 25299 | 15132 | 7996 | 4347 | 20.71 |
| 6 | 25 | 74 | 1 | 190100 | 68774 | 30079 | 11383 | 5479 | 37.76 |
| 7 | 25 | 72 | 3 | 520600 | 107140 | 41430 | 13483 | 6098 | 46.17 |
| 8 | 25 | 70 | 5 | 645900 | 125270 | 46202 | 14377 | 6342 | 49.87 |

Based on the above data it is clear that the compositions of interest herein are unique and are dependent upon the AAPE/PLA blend ratio.

The invention has been described in detail with particular reference to preferred embodiments thereof, but it will be understood that variations and modifications can be effected within the spirit and scope of the invention.

I claim:

1. A polymer blend comprising:
   (A) about 5% to about 95% by weight of at least one flexible biodegradable polymer (A) having a glass transition temperature less than about 0° C.,
   (B) about 95% to about 5% by weight of at least one rigid biodegradable polymer (B) having a glass transition temperature greater than about 10° C., and
   (C) about 0.25 to about 10 weight % of at least one compatibilizer (C), said percentages being based on the total weight of the polymer blend;
   wherein said polymer blend has a higher zero shear melt viscosity than polymers (A) and (B) separately;
   wherein said compatibilizer (C) comprises a polyacrylate and said rigid biodegradable polymer (B) is selected from the group consisting of polyesteramides; polyethylene terephthalate comprising sulfonated terephthalate units and aliphatic units derived from two or more different diols selected from the group consisting of ethylene glycol, diethylene glycol, triethylene oxide, and polyethylene glycol; biopolymers based on polylactic acid; polyethylene carbonate; polyhydroxyalkanoates; polyhydroxybutyrates; polyhydroxyvalerates; and polyhydroxybutyrate-hydroxyvalerate copolymers.

2. The polymer blend according to claim 1 comprising:
   (A) about 15% to about 85% by weight of said at least one flexible biodegradable polymer (A); and
   (B) about 85% to about 15% by weight of said at least one rigid biodegradable polymer (B).

3. The polymer blend according to claim 2 comprising:
   (A) about 15% to about 50% by weight of said at least one flexible biodegradable polymer (A); and
   (B) about 85% to about 50% by weight of said at least one rigid biodegradable polymer (B).

4. The polymer blend according to claim 3 comprising:
   (A) about 20% to about 40% by weight of said at least one flexible biodegradable polymer (A); and
   (B) about 80% to about 60% by weight of said at least one rigid biodegradable polymer (B).

5. The polymer blend according to claim 4 comprising:
   (A) about 30% to about 21% by weight of said at least one flexible biodegradable polymer (A); and
   (B) about 79% to about 70% by weight of said at least one rigid biodegradable polymer (B).

6. The polymer blend according to any one of claims 1-5 comprising:
   (A) at least one said biodegradable polymer (A) having a Tg of less than about −10° C.; and
   (B) at least one said biodegradable polymer (B) having a Tg of greater than about 20° C.

7. The polymer blend according to claim 6 comprising:
   (A) at least one said biodegradable polymer (A) having a Tg of less than about −20° C.; and
   (B) at least one said biodegradable polymer (B) having a Tg of greater about 30° C.

8. The polymer blend according to claim 7 comprising:
   (A) at least one said biodegradable polymer (A) having a Tg of less than about −30° C.; and
   (B) at least one said biodegradable polymer (B) having a Tg of greater than about 40° C.

9. The polymer blend according to any one of claims 1-5 which has a zero shear melt viscosity greater than 50,000 Poise at 195° C.

10. The polymer blend according to any one of claims 1-5 which has a higher Izod impact strength, as measured by ASTM Method D236, than blends that do not contain a compatibilizer.

11. The blend of according to claim 1 wherein said polymer (A) is selected from the group consisting of aliphatic-aromatic polyesters, polycaprolactone, and succinate-based aliphatic polymers.

12. The blend according to claim 1 wherein said polymer (A) is selected from the group consisting of aliphatic-aromatic polyesters, polyhydroxyvalerates, polyhydroxybutyrate-hydroxyvalerates, polycaprolactone, polybutylene succinate, polybutylene succinate adipate, and polyethylene succinate.

13. The blend according to claim 1 wherein said at least one polymer (A) is an aliphatic-aromatic polyester.

14. The blend according to claim 13 wherein said at least one polymer (A) is an aliphatic-aromatic polyester comprising:
   (1) diacid residues comprising about 1 to 65 mole percent aromatic dicarboxylic acid residues; and 99 to about 35 mole percent of non-aromatic dicarboxylic acid residues selected from the group consisting of aliphatic dicarboxylic acids residues containing from about 4 to 14 carbon atoms and cycloaliphatic dicarboxylic acids residues containing from about 5 to 15 carbon atoms; wherein the total mole percent of diacid residues is equal to 100 mole percent; and (2) diol residues selected from the group consisting of one or more aliphatic diols containing about 2 to 8 carbon atoms, polyalkylene ethers containing about 2 to 8 carbon atoms, and cycloaliphatic diols containing from about 4 to 12 carbon atoms; wherein the total mole percent of diol residues is equal to 100 mole percent.

15. The blend according to claim 14 wherein the aromatic dicarboxylic acid residues are selected from the group consisting of terephthalic acid, isophthalic acid, and mixtures thereof.

16. The blend according to claim 15 wherein said aliphatic-aromatic copolyester comprises about 25 to 65 mole percent of terephthalic acid residues.

17. The blend according to claim 16 wherein said aliphatic-aromatic copolyester comprises about 35 to 65 mole percent of terephthalic acid residues.

18. The blend according to claim 17 wherein said aliphatic-aromatic copolyester comprises about 40 to 60 mole percent of terephthalic acid residues.

19. The blend according to claim 13 wherein the diacid and diol residues of said aliphatic-aromatic polyester consist essentially of:
(1) aromatic dicarboxylic acid residues comprising about 25 to 65 mole percent of terephthalic acid residues and 75 to about 35 mole percent non-aromatic dicarboxylic acid residues; and
(2) diol residues consisting of aliphatic diols.

20. The blend according to claim 19 wherein the diacid and diol residues of said aliphatic-aromatic polyester consists essentially of:
(1) aromatic dicarboxylic acid residues comprising about 25 to 65 mole percent of terephthalic acid residues and 75 to about 35 mole percent of adipic acid residues, glutaric acid residues, or combinations of adipic acid residues and glutaric acid residues; and
(2) diol residues consisting of 1,4-butanediol.

21. The blend according to claim 20 wherein the diacid and diol residues of said aliphatic-aromatic polyester consist essentially of:
(1) aromatic dicarboxylic acid residues comprising about 35 to 65 mole percent of terephthalic acid residues and 65 to about 35 mole percent of adipic acid residues, glutaric acid residues, or combinations of adipic acid residues and glutaric acid residues; and
(2) diol residues consisting of 1,4-butanediol.

22. The blend according to claim 21 wherein the diacid and diol residues of said aliphatic-aromatic polyester consist essentially of:
(1) aromatic dicarboxylic acid residues comprising about 40 to 60 mole percent of terephthalic acid residues and 60 to about 40 mole percent of adipic acid residues, glutaric acid residues, or combinations of adipic acid residues and glutaric acid residues; and
(2) diol residues consisting of 1,4-butanediol.

23. The blend according to claim 14 wherein the non-aromatic dicarboxylic acid residues are selected from the group consisting of adipic acid, glutaric acid and mixtures thereof.

24. The blend according to claim 23 wherein said aliphatic-aromatic copolyester comprises about 75 to 35 mole percent of non-aromatic dicarboxylic acid(s) selected from the group consisting of adipic acid, glutaric acid, and mixtures thereof.

25. The blend according to claim 24 wherein said aliphatic-aromatic copolyester comprises about 65 to 35 mole percent of non-aromatic dicarboxylic acid(s) selected from the group consisting of adipic acid, glutaric acid, and mixtures thereof.

26. The blend according to claim 25 wherein said aliphatic-aromatic copolyester comprises about 40 to 60 mole percent of non-aromatic dicarboxylic acid(s) selected from the group consisting of adipic acid, glutaric acid, and mixtures thereof.

27. The blend according to claim 14 wherein the diol residue(s) of polyester (A) are selected from the group consisting of ethylene glycol, diethylene glycol, propylene glycol, 1,3-propanediol, 2,2-dimethyl-1,3-propanediol, 1,3-butanediol, 1,4-butanediol, 1,5-pentanediol, 1,6-hexanediol, polyethylene glycol, diethylene glycol, 2,2,4-trimethyl-1,6-hexaned iol, thio-diethanol, 1,3-cyclohexanedimethanol, 1,4-cyclohexanedimethanol, 2,2,4,4-tetramethyl-1,3-cyclobutanediol, triethylene glycol, tetraethylene glycol and combinations of two or more diol residues thereof.

28. The blend according to claim 14 wherein the diol residues of said aliphatic-aromatic polyester consist essentially of aliphatic diol residues.

29. The blend according to claim 14 wherein polyester (A) comprises diol(s) selected from the group consisting of 1,4-butanediol, 1,3-propanediol, ethylene glycol, 1,6-hexanediol, diethylene glycol, 1,4-cyclohexanedimethanol and combinations of two or more diol residues thereof.

30. The blend according to claim 29 wherein said aliphatic-aromatic polyester comprises diol(s) selected from the group consisting of 1,4-butanediol, ethylene glycol, 1,4-cyclohexanedimethanol and combinations of two or more diol residues thereof.

31. The blend according to claim 30 wherein the diol residues of said atiphatic-aromatic polyester comprise 1,4-butanediol.

32. The blend according to claim 31 wherein the diol residues comprise about 80 to 100 mole percent of 1,4-butanediol; wherein the total mole percent of diol residues is equal to 100 mole percent.

33. The blend according to claim 1 wherein said at least one polymer (B) is a biopolymer based on polylactic acid.

34. A polymer blend comprising:
(A) about 5% to about 95% by weight of at least one polymer (A) having a glass transition temperature less than about 0° C., wherein said polymer (A) is an aliphatic-aromatic copolyester comprising:
(1) diacid residues comprising about 1 to 65 mole percent aromatic dicarboxylic acid residues; and 99 to about 35 mole percent of non-aromatic dicarboxylic acid residues selected from the group consisting of aliphatic dicarboxylic acids residues containing from about 4 to 14 carbon atoms and cycloaliphatic dicarboxylic acids residues containing from about 5 to 15 carbon atoms; wherein the total mole percent of diacid residues is equal to 100 mole percent; and
(2) diol residues selected from the group consisting of one or more aliphatic diols containing about 2 to 8 carbon atoms, polyalkylene ethers containing about 2 to 8 carbon atoms, and cycloaliphatic diols containing from about 4 to 12 carbon atoms; wherein the total mole percent of diol residues is equal to 100 mole percent;
(B) about 5% to about 95% by weight of at least one polymer (B) having a glass transition temperature greater than about 10° C., wherein said polymer (B) is a biopolymer based on polylactic acid; and (C) about 0.25 to about 10 weight % of at least one compatibilizer (C), said percentages being based on the total weight of the polymer blend;

wherein the polymer blend has a higher zero shear melt viscosity than polymers (A) and (B) separately;

wherein said compatibilizer (C) comprises a polyacrylate.

35. The blend according to claim 34 wherein said polymer (A) is present between at 15 and 85 weight % and said polymer (B) is present at between 85 and 15 weight % based on the total weight of polymer (A) and polymer (B).

36. The blend according to claim 35 wherein said polymer (A) is present between at 15 and 50 weight % and said polymer (B) is present at between 85 and 50 weight % based on the total weight of polymer (A) and polymer (B).

37. The blend according to claim 36 wherein said polymer (A) is present between at 20 and 40 weight % and said polymer (B) is present at between 80 and 60 weight % based on the total weight of polymer (A) and polymer (B).

38. The blend according to claim 37 wherein said polymer (A) is present between at 20 and 31 weight % and said polymer (B) is present at between 79 and 70 weight % based on the total weight of polymer (A) and polymer (B).

39. The blend according to claim 34 which comprises about 1% to about 50% by weight of at least one biodegradable additive (D) selected from the group consisting of microcrystalline cellulose, polyvinyl alcohol, and thermoplastic starch, said percentages being based on the total weight of the polymer blend;

wherein the polymer blend has a higher zero shear melt viscosity than individual polymer components.

40. The blend according to claim 34 which has a zero shear melt viscosity greater than 50,000 Poise at 190° C.

41. The blend according to claim 34 which has a higher Izod impact strength, as measured by ASTM Method D236, than blends that do not contain a compatibilizer.

42. The blend according to claim 34 wherein said aliphatic-aromatic copolyester comprises about 25 to 65 mole percent of terephthalic acid residues.

43. The blend according to claim 42 wherein said aliphatic-aromatic copolyester comprises about 35 to 65 mole percent of terephthalic acid residues.

44. The blend according to claim 43 wherein said aliphatic-aromatic copolyester comprises about 40 to 60 mole percent of terephthalic acid residues.

45. The blend according to claim 34 wherein the non-aromatic dicarboxylic acid residues are selected from the group consisting of adipic acid, glutaric acid and mixtures thereof.

46. The blend according to claim 45 wherein said aliphatic-aromatic copolyester comprises about 75 to 35 mole percent of non-aromatic dicarboxylic acid(s) selected from the group consisting of adipic acid, glutaric acid, and mixtures thereof.

47. The blend according to claim 46 wherein said aliphatic-aromatic copolyester comprises about 65 to 35 mole percent of non-aromatic dicarboxylic acid(s) selected from the group consisting of adipic acid, glutaric acid, and mixtures thereof.

48. The blend according to claim 47 wherein said aliphatic-aromatic copolyester comprises about 40 to 60 mole percent of non-aromatic dicarboxylic acid(s) selected from the group consisting of adipic acid, glutaric acid, and mixtures thereof.

49. The blend according to claim 34 wherein one or more diol residue(s) of said aliphatic-aromatic copolyester are selected from the group consisting of ethylene glycol, diethylene glycol, propylene glycol, 1,3-propanediol, 2,2-dimethyl-1,3-propanediol, 1,3-butanediol, 1,4-butanediol, 1,5-pentanediol, 1,6-hexanediol, polyethylene glycol, diethylene glycol, 1,3-cyclohexane-dimethanol, 1,4-cyclohexaned imethanol, 2,2,4,4-tetramethyl-1,3-cyclobutanediol, triethylene glycol, and tetraethylene glycol.

50. The blend according to claim 49 wherein one or more diol residues of said aliphatic-aromatic copolyester comprises diol(s) selected from the group consisting of 1,4-butanediol, 1,3-propanediol, ethylene glycol, 1,6-hexanediol, diethylene glycol, and 1,4-cyclohexanedimethanol.

51. The blend according to claim 49 wherein one or more diol residues of said aliphatic-aromatic copolyester comprises diol(s) selected from the group consisting of 1,4-butanediol, ethylene glycol, and 1,4-cyclohexanedimethanol.

52. The blend according to claim 51 wherein one or more diol residues of said aliphatic-aromatic copolyester comprise 1,4-butanediol.

53. The blend according to claim 52 wherein the diol residues comprise about 80 to 100 mole percent of 1,4-butanediol; wherein the total mole percent of diol residues is equal to 100 mole percent.

54. The blend according to claim 53 wherein the diol residues comprise about 95 to 100 mole percent of 1,4-butanediol; wherein the total mole percent of diol residues is equal to 100 mole percent.

55. The blend according to claim 34 wherein one or more diol residues of said aliphatic-aromatic copolyester consist essentially of aliphatic diol residues.

56. The blend according to claim 34 wherein the diacid and diol residues of said aliphatic-aromatic copolyester consist essentially of:
   (1) aromatic dicarboxylic acid residues comprising about 25 to 65 mole percent of terephthalic acid residues and 75 to about 35 mole percent non-aromatic dicarboxylic acid residues; and
   (2) diol residues consisting of aliphatic diols.

57. The blend according to claim 56 wherein the diacid and diol residues of said aliphatic-aromatic copolyester consist essentially of:
   (1) aromatic dicarboxylic acid residues comprising about 25 to 65 mole percent of terephthalic acid residues and 75 to about 35 mole percent of adipic acid residues, glutaric acid residues, and combinations of adipic acid residues and glutaric acid residues; and
   (2) diol residues consisting of 1,4-butanediol.

58. The blend according to claim 57 wherein the diacid and diol residues of said aliphatic-aromatic copolyester consist essentially of:
   (1) aromatic dicarboxylic acid residues comprising about 35 to 65 mole percent of terephthalic acid residues and 65 to about 35 mole percent of adipic acid residues, glutaric acid residues, or combinations of adipic acid residues and glutaric acid residues; and
   (2) diol residues consisting of 1,4-butanediol.

59. The blend according to claim 58 wherein the diacid and diol residues of said aliphatic-aromatic copolyester consist essentially of:
   (1) aromatic dicarboxylic acid residues comprising about 40 to 60 mole percent of terephthalic acid residues and 60 to about 40 mole percent of adipic acid residues, glutaric acid residues, and combinations of adipic acid residues and glutaric acid residues; and
   (2) diol residues consisting of 1,4-butanediol.

60. The blend according to claim 1 or claim 34 wherein the polymer (A)/polymer (B) ratio is 1:3.

61. The blend according to claims 1 or 34 wherein the compatibilizer (C) is present in the polymer blend in the amount of 0.25 to about 5.0 weight %.

62. The blend according to claim 1 or 34 wherein said polyacrylate comprises methylmethacrylate or glycidyl methacrylate monomer.

63. A polymer blend comprising:
(A) about 5% to about 95% by weight of at least polymer (A), wherein said polymer (A) is an aliphatic-aromatic copolyester consisting essentially of:
  (1) aromatic dicarboxylic acid residues comprising about 35 to 65 mole percent of terephthalic acid residues and 65 to about 35 mole percent of adipic acid residues, glutaric acid residues, or combinations of adipic acid residues and glutaric acid residues; and
  (2) diol resklues consisting of 1,4-butanediol;
(B) about 5% to about 95% by weight of at least one polymer (B), wherein said polymer (B) is a biopolymer based on polylactic acid; and
(C) about 0.25 to about 10 weight % of at least one compatibilizer (C) consisting essentially of polyacrylate, said percentages being based on the total weight of said polymer blend;
wherein said polymer blend has a higher zero shear melt viscosity than polymers (A) and (B) separately.

64. The blend according to claim 63 wherein said polyacrylate comprises methylmethacrylate or glycidyl methacrylate monomer.

65. The blend according to claim 63 wherein said polymer (A) is present between at 15 and 85 weight % and said polymer (B) is present at between 85 and 15 weight % based on the total weight of polymer (A) and polymer (B).

66. The blend according to claim 65 wherein said polymer (A) is present between at 15 and 50 weight % and said polymer (B) is present at between 85 and 50 weight % based on the total weight of polymer (A) and polymer (B).

67. The blend according to claim 66 wherein said polymer (A) is present between at 20 and 40 weight % and said polymer (B) is present at between 80 and 60 weight % based on the total weight of polymer (A) and polymer (B).

68. The blend according to claim 67 wherein said polymer (A) is present between at 20 and 31 weight % and said polymer (B) is present at between 79 and 70 weight % based on the total weight of polymer (A) and polymer (B).

69. The blend according to claim 63 which comprises about 1% to about 50% by weight of at least one biodegradable additive (p) selected from the group consisting of microcrystalline cellulose, polyvinyl alcohol, and thermoplastic starch, said percentages being based on the total weight of said polymer blend;
wherein said polymer blend has a higher zero shear melt viscosity than individual polymer components.

70. The blend according to claim 63 which has a zero shear viscosity greater than 50,000 Poise at 190° C.

71. The blend according to claim 63 which has a higher Izod impact strength, as measured by ASTM Method D236, than blends that do not contain a compatibilizer.

72. The blend according to claim 63 wherein said aliphatic-aromatic copolyester comprises about 40 to 60 mole percent of one or more non-aromatic dicarboxylic acid(s) selected from the group consisting of adipic acid and glutaric acid.

73. The blend according to claims 34 or 63 wherein said aliphatic-aromatic copolyester is branched.

74. The blend according to claim 63 wherein the polymer (A)/polymer (B) ratio is 1:3.

75. A film or sheet comprising a polymer blend according to claims 1, 34, or 63.

76. A film or sheet according to claim 75 wherein said film or sheet was produced by extrusion or calendering.

77. A molded or formed article comprising a polymer blend according to claims 1, 34, or 63.

78. A molded or formed article according to claim 77 wherein said article was produced by injection molding or extrusion blow molding.

* * * * *